(12) United States Patent
Codilian et al.

(10) Patent No.: US 6,204,988 B1
(45) Date of Patent: Mar. 20, 2001

(54) DISK DRIVE CAPABLE OF AUTONOMOUSLY EVALUATING AND ADAPTING THE FREQUENCY RESPONSE OF ITS SERVO CONTROL SYSTEM

(75) Inventors: Raffi Codilian, Irvine; Edgar De-Jia Sheh, Cupertino; Jie Yu, Irvine, all of CA (US)

(73) Assignee: Western Digital Corporation, Irvine, CA (US)

( * ) Notice: Subject to any disclaimer, the term of this patent is extended or adjusted under 35 U.S.C. 154(b) by 0 days.

(21) Appl. No.: 09/138,841

(22) Filed: Aug. 24, 1998

(51) Int. Cl.[7] .................................................. G11B 21/02
(52) U.S. Cl. ............................................. 360/75; 318/561
(58) Field of Search ........................ 360/75, 77.02, 360/77.04, 77.05, 77.08, 78.04, 78.09; 318/561, 568.22

(56) References Cited

U.S. PATENT DOCUMENTS

| | | |
|---|---|---|
| 4,839,573 | 6/1989 | Wise . |
| 4,890,172 | 12/1989 | Watt et al. .................... 360/78.09 X |
| 5,155,422 * | 10/1992 | Sidman et al. ................ 360/77.04 X |
| 5,369,345 * | 11/1994 | Phan et al. ..................... 360/77.04 X |
| 5,404,255 * | 4/1995 | Kobayashi et al. ............... 360/78.09 |
| 5,774,299 * | 6/1998 | Baum et al. ...................... 360/77.08 |
| 6,072,654 * | 6/2000 | Eddy ................................. 360/77.04 |

* cited by examiner

Primary Examiner—W. R. Young
Assistant Examiner—James L Habermehl
(74) Attorney, Agent, or Firm—Milad G Shara

(57) ABSTRACT

The invention is a method of characterizing the frequency response of the servo control system in a disk drive having a sampled servo system having a sampling rate and a nominal bandwidth, wherein the sampled servo system comprises a plant and a servo controller that controls the plant using a compensator and a gain element with a nominal open loop gain. The invention is, in more detail, a method for adaptively modifying the servo controller to compensate for plant variations which are incompatible with the nominal gain and bandwidth, including the steps of implementing a self-generated bode plot to determine a gain margin and a phase margin, and if the gain margin is not greater than a predetermined minimum, adjusting the open loop gain of the servo controller to provide a gain margin which is greater than the predetermined minimum at a bandwidth which is different than the nominal bandwidth; and adjusting the compensator to provide a phase margin which is greater than a predetermined minimum.

19 Claims, 14 Drawing Sheets

STEP #2

| FREQUENCY (Hz) | GAIN (dB) | PHASE (DEGREES) |
|---|---|---|
| 83 | 37.6 | 172 |
| 111 | 23.3 | 134 |
| 138 | 18.2 | 154 |
| 166 | 14.3 | 170 |
| 194 | 12.2 | 178 |
| 222 | 9.6 | -175 |
| 249 | 8.0 | -165 |
| 277 | 6.8 | -160 |
| 305 | 5.8 | -157 |
| 333 | 4.9 | -151 |
| 360 | 4.4 | -149 |
| 388 | 3.6 | -149 |
| 416 | 3.1 | -148 |
| 444 | 2.5 | -147 |
| 471 | 2.0 | -146 |
| 499 | 1.5 | -146 |
| 527 | 1.1 | -145 |
| 555 | 0.7 | -145 |
| 582 | 0.3 | --> -145 |
| 610 | -0.1 | --> -145 |
| 638 | -0.5 | -145 |
| 666 | -0.7 | -146 |
| 693 | -1.0 | -146 |
| 721 | -1.2 | -148 |
| 749 | -1.7 | -148 |
| 777 | -1.9 | -149 |
| 804 | -2.3 | -151 |
| 832 | -2.5 | -151 |
| 860 | -2.7 | -152 |
| 888 | -2.9 | -154 |
| 915 | -3.2 | -155 |
| 943 | -3.4 | -156 |
| 971 | -3.6 | -156 |
| 999 | -3.8 | -157 |
| 1026 | -3.9 | -158 |
| 1054 | -4.1 | -159 |
| 1082 | -4.2 | -159 |
| 1110 | -4.3 | -161 |
| 1137 | -4.6 | -163 |
| 1165 | -4.9 | -162 |
| 1193 | -4.8 | -164 |
| 1221 | -4.7 | -161 |
| 1248 | -4.6 | -165 |
| 1276 | -4.7 | -167 |
| 1304 | -4.7 | -169 |
| 1332 | -4.8 | -171 |
| 1359 | -4.9 | -173 |
| 1387 | -5.0 | -176 |
| 1415 | -5.1 | -177 |
| 1443 | -5.2 | <--- -179 |
| 1470 | -5.3 | <--- 178 |
| 1498 | -5.5 | 176 |
| 1526 | -5.8 | 174 |
| 1554 | -5.8 | 174 |
| 1581 | -6.0 | 173 |
| 1609 | -6.0 | 174 |
| 1637 | -5.8 | 171 |
| 1665 | -5.8 | 169 |
| 1692 | -5.9 | 166 |
| 1720 | -6.0 | 166 |
| 1748 | -5.7 | 163 |
| 1776 | -5.8 | 162 |
| 1803 | -5.8 | 160 |
| 1831 | -5.8 | 158 |
| 1859 | -5.6 | 155 |
| 1887 | -5.6 | 153 |
| 1914 | -5.5 | 151 |
| 1942 | -5.4 | 149 |
| 1970 | -5.2 | 148 |
| 1998 | -5.1 | 144 |
| 2025 | -4.9 | 142 |
| 2053 | -4.5 | 139 |
| 2081 | -4.6 | 131 |
| 2109 | -4.8 | 132 |
| 2136 | -4.5 | 129 |
| 2164 | -4.3 | 125 |
| 2192 | -4.2 | 119 |
| 2220 | -4.4 | 115 |
| 2247 | -4.6 | 112 |
| 2275 | -4.8 | 108 |
| 2303 | -5.1 | 103 |
| 2331 | -5.8 | 101 |
| 2358 | -5.9 | 97 |
| 2386 | -6.2 | 93 |
| 2414 | -6.5 | 89 |
| 2442 | -7.0 | 87 |
| 2469 | -7.7 | 85 |

FIG. 12

DISK DRIVE CAPABLE OF AUTONOMOUSLY EVALUATING AND ADAPTING THE FREQUENCY RESPONSE OF ITS SERVO CONTROL SYSTEM

FIELD OF THE INVENTION

The present invention relates generally to magnetic disk drives and, more particularly, to a disk drive with a servo control system that self-characterizes its own frequency response and, if warranted, adapts itself to increase its operating stability.

BACKGROUND OF THE RELATED ART

It is well known that determining the frequency response of a control system can help identify problems which may arise during system operation. In the context of magnetic disk drives, however, the frequency response of the servo control system has generally been measured by external test equipment that costs thousands of dollars. The tests, moreover, must occur in a clean room environment because it requires invasive access to the drive's interior. Finally, it may take several minutes to several hours to complete the frequency characterization of a single drive using such external test equipment. Because of these limitations, the drive industry generally tests the frequency response of only a limited number of drives during product development.

During manufacture, each production drive is simply assumed to have a frequency response that is sufficiently "close" to the nominal disk drive(s) tested during development to make the drive operable. There is no mechanism to validate the frequency response on a drive by drive basis. There is conventionally no mechanism to vary the frequency response to salvage a marginal drive individually.

Unfortunately, the frequency response of each production drive may vary from the nominal response of the development drives due to an unpredictable combination of characteristics including the electromagnetic response of each individual read transducer, each transducer's location on the head stack, mechanical misalignments, and electronic component variations. Moreover, circumstances which cause deviations from the nominal frequency response are also likely to alter the magnitude and location of resonances and, thereby, reduce the servo system's gain margin, phase margin, or both, to the detriment of the servo system's operating stability.

The drive industry is highly competitive such that there is a clear need to reduce the percentage of customer returns and obtain a higher overall yield of disk drives in the mass production environment.

SUMMARY OF THE INVENTION

In a first aspect, the invention is implemented in a disk drive comprising a sampled servo feedback control system having a sampling frequency and including (1) a plant which has a nominal plant frequency response and (2) a servo controller which comprises (i) a compensator with a nominal compensator frequency response and (ii) a gain element with a nominal open-loop gain, the compensator and gain element being designed to define the overall sampled servo feedback control system with a desired open-loop bandwidth frequency, a desired gain margin, and a desired phase margin which collectively provide for stable closed-loop operation given the nominal plant frequency response, and may be regarded as a method of adaptively self-modifying the servo controller to compensate for deviations from the nominal plant frequency response owing to individual plant variations, the method comprising the steps of: autonomously determining a phase crossover frequency $f_{PC}$ by (1) measuring the sampled servo feedback control system's open-loop phase response to sinusoidal inputs at a plurality of discrete frequencies and (2) determining which of the plurality of discrete frequencies is associated with an open-loop phase response that is substantially equal or closest to −180 degrees; autonomously determining a measured gain margin by measuring the sampled servo feedback control system's open-loop magnitude response to a sinusoidal input at the phase cross-over frequency $f_{PC}$; and adjusting the open-loop gain of the servo controller's gain element relative to the nominal open-loop gain if the measured gain margin is different than the desired gain margin to provide an adjusted gain margin that is substantially equal to the desired gain margin.

In a second aspect, the invention is implemented in a disk drive comprising a sampled servo feedback control system having a sampling frequency and including (1) a plant which has a nominal plant frequency response and (2) a servo controller which comprises (i) a compensator with a nominal compensator frequency response and (ii) a gain element with a nominal open-loop gain, the compensator and gain element being designed to define the overall sampled servo feedback control system with a desired open-loop bandwidth frequency, a desired gain margin, and a desired phase margin which collectively provide for a desired closed-loop operation in terms of stability and operating performance given the nominal plant frequency response, and may be regarded as a method of adaptively self-modifying the servo controller to compensate for deviations from the nominal plant frequency response owing to individual plant variations, the method comprising the steps of: autonomously determining a phase crossover frequency $f_{PC}$ by (1) measuring the sampled servo feedback control system's open-loop phase response to sinusoidal inputs at a plurality of discrete frequencies and (2) determining which of the plurality of discrete frequencies is associated with an open-loop phase response that is substantially equal or closest to −180 degrees; autonomously determining a measured gain margin by measuring the sampled servo feedback control system's open-loop magnitude response to a sinusoidal input at the phase cross-over frequency $f_{PC}$; adjusting the open-loop gain of the servo controller's gain element relative to the nominal open-loop gain if the measured gain margin is different than the desired gain margin to provide an adjusted gain margin that is substantially equal or closest to the desired gain margin; and adjusting the compensator frequency response relative to the nominal compensator frequency response to compensate for the phase margin being moved relative to the desired phase margin by the step of adjusting the open loop gain and to provide an adjusted phase margin that is substantially equal to the desired phase margin.

In a third aspect, the invention is implemented in a disk drive having a sampled servo system having a sampling rate and a nominal bandwidth, wherein the sampled servo system comprises a plant and a servo controller that controls the plant using a compensator and a gain element with a nominal open loop gain, and the invention may be regarded as a method for adaptively modifying the servo controller to compensate for plant variations which are incompatible with the nominal gain and bandwidth comprising the steps of: implementing a self-generated bode plot to determine a gain margin and a phase margin, and if the gain margin is not greater than a predetermined minimum: adjusting the open loop gain of the servo controller to provide a gain margin which is greater than the predetermined minimum at a bandwidth which is different than the nominal bandwidth; and adjusting the compensator to provide a phase margin which is greater than a predetermined minimum.

BRIEF DESCRIPTION OF THE DRAWINGS

The just summarized invention can be best understood with reference to the following description taken in view of the drawings of which:

FIG. 12 is a table of Bode plot values derived with a plurality of discrete frequencies;

DETAILED DESCRIPTION OF THE PREFERRED EMBODIMENTS

The invention is a disk drive that independently, rapidly and cost effectively characterizes its own frequency response without using external test equipment and then produces frequency response parameters which the drive uses to classify its operability (e.g. good or bad), to autonomously adapt its servo controller to "save" itself if it is a marginal drive which may otherwise have to be reworked or discarded, or to autonomously adapt its servo controller to increase the consistency between the several "servo loops" associated with its several transducer (sometimes hereafter "transducer loops") and improve its performance even if it is an otherwise good drive.

1. The Disk Drive and its "Transducer Loops"

Figure 1:
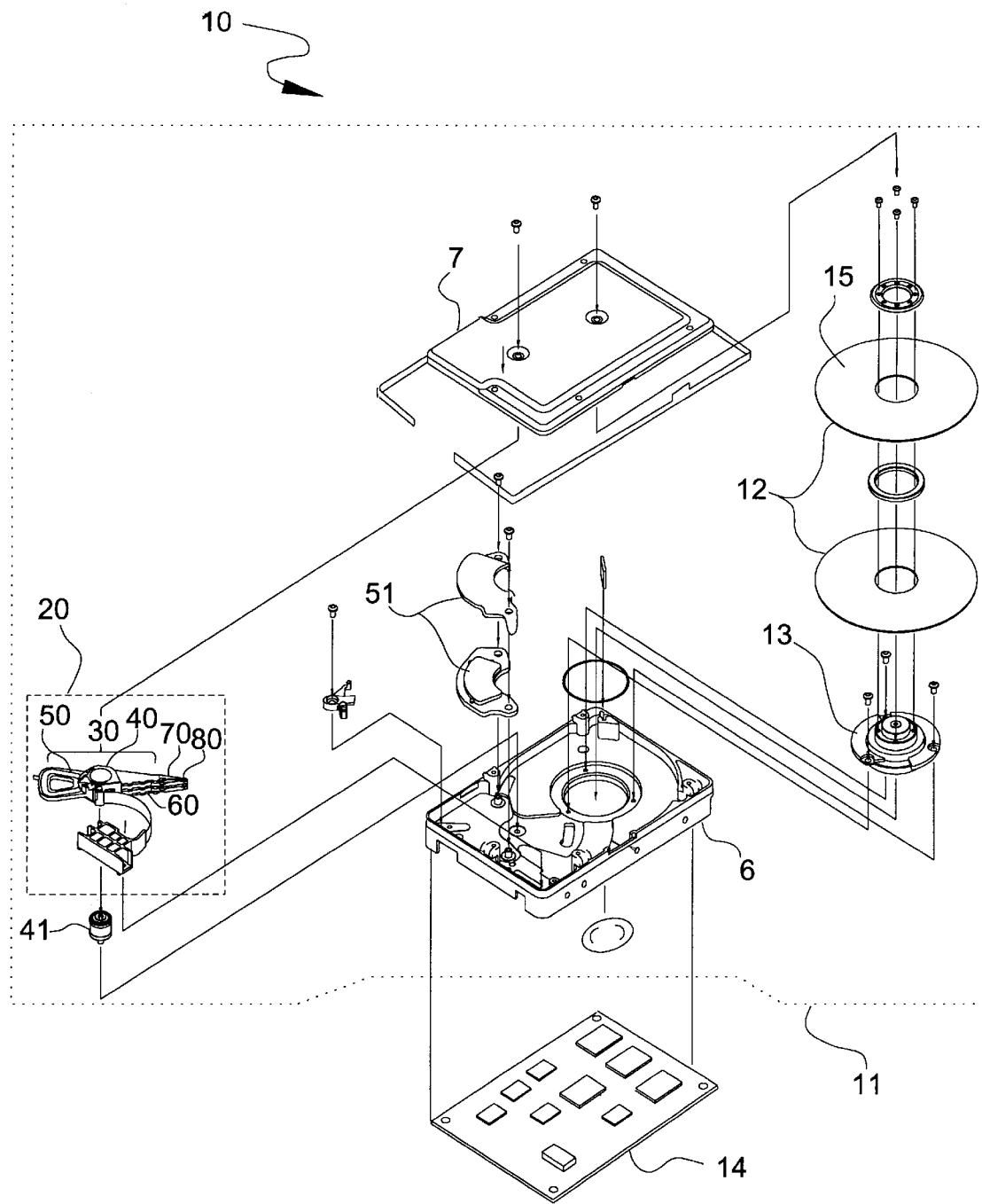
FIG. 1 is an exploded perspective view of a magnetic disk drive 10 having a head disk assembly 11 ("HDA") which contains a magnetic disk 12 and a head stack assembly 20 ("HSA") having an actuator assembly 30 and a head gimbal assembly ("HGA") 70 which movably support a read transducer 80 over the magnetic disk 12.

FIG. 1 shows the principal components of a disk drive 10 that incorporates the herein disclosed method of autonomously characterizing and adapting its servo control system. The disk drive 10 shown is an integrated drive electronics (IDE) drive, comprising a head disk assembly 11 ("HDA") and a controller circuit board 14.

Figure 2:
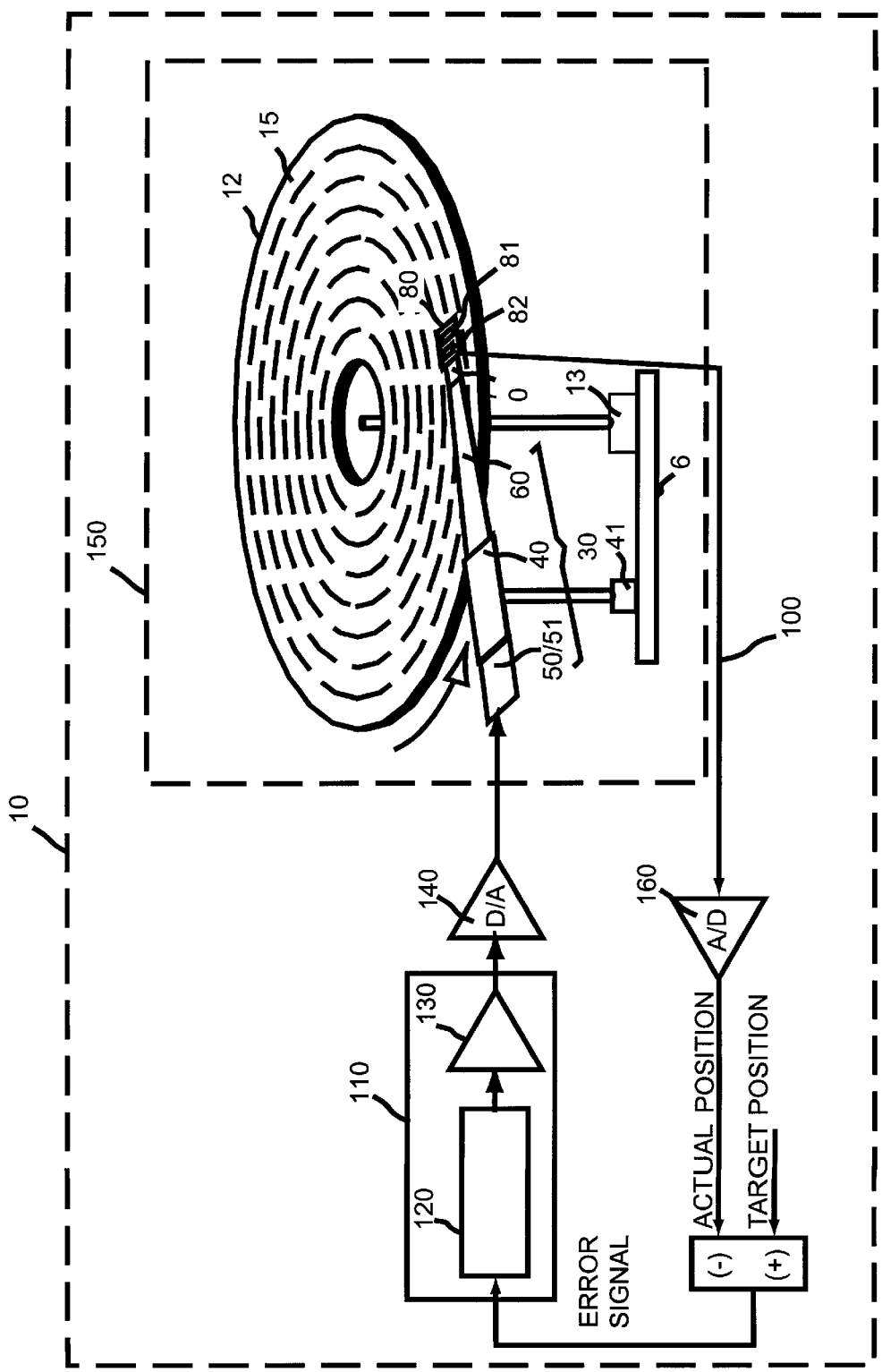
FIG. 2 is a hybrid block diagram of a servo control system 100 in the disk drive 10 of FIG. 1.
Figure 3:
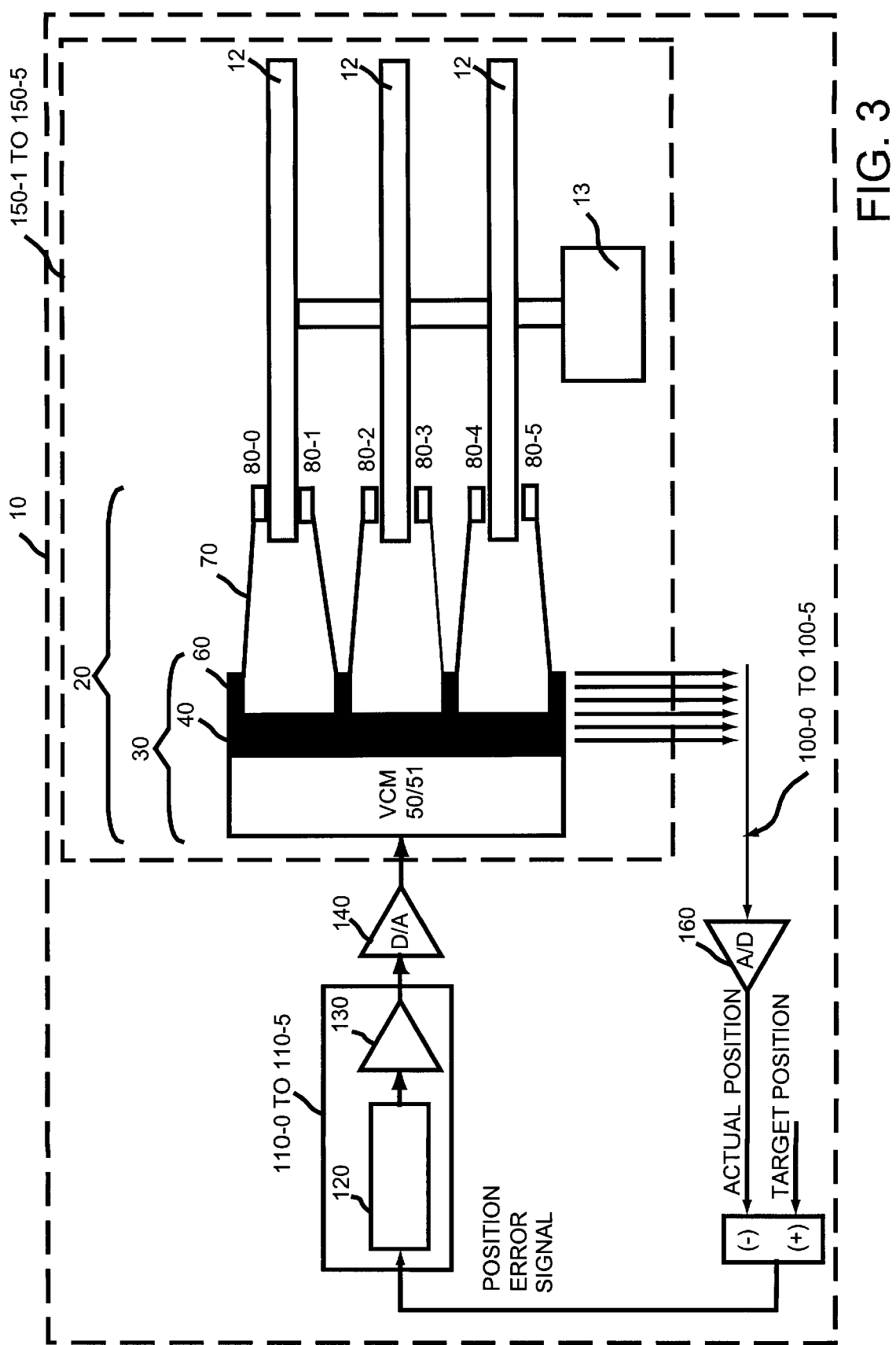
FIG. 3 is a hybrid block diagram of the several servo control loops 100-0 to 100-5 associated with different heads 80-0 to 80-5.

The HDA 11 of FIG. 1 comprises a magnetic disk 12 (2 shown), a spindle motor 13 for rapidly rotating the disk 12, and a head stack assembly 20 ("HSA") located next to the disk 12. The HSA 20 shown comprises a swing-type actuator assembly 30, a head gimbal assembly 70 ("HGA"), and a head 80. The actuator assembly 30 comprises a voice coil 50, an actuator body 40, and an actuator arm 60. The voice coil 50 interacts with at least one permanent magnet 51 (two are shown) to form a voice coil motor or "VCM" 50/51 (see FIGS. 2 and 3) that pivots the overall actuator assembly 30 on a pivot cartridge 41. The HGA 70 is cantilevered from the actuator arm 60 so that the head 80 is held over the disk 12. The head 80, as shown more clearly in FIG. 2, generally comprises a slider that carries a read transducer 81 and a write transducer 82. The HDA's storage capacity may be increased, as shown in FIGS. 1 and 3, by including several disks 12 and an HSA 20 having multiple actuator arms 60 which support a vertical "stack" of HGAs 70 and associated heads 80—one for each surface 15 of each disk 12.

In the vernacular of feedback control systems, a conventional disk drive has a servo control system comprising a "plant" which includes a moveable element (which moves relative to non-driven components) and a servo controller for driving the moveable element. FIG. 2 schematically illustrates a servo control system or servo loop 100 that may be implemented in the magnetic disk drive 10 of FIG. 1. As shown, the servo control system 100 broadly comprises a servo controller 110 and a plant 150.

The servo controller 110 is normally implemented as a combination of hardware, including a microprocessor, and firmware that executes on the controller circuit board 14. In a simplified view, the servo controller 110 interfaces to the external world with a digital-to-analog (D/A) converter 140 and a transducer signal processing circuit which may be viewed as an analog-to-digital (A/D) converter 160. In such context, the servo controller 110 may be viewed as comprising a normalized digital compensator 120 and a separate gain element 130 that are conceptually implemented in the firmware, controlled by the firmware, or both.

As further shown in FIG. 2, a typical plant 150 comprises a base 6, a spindle motor 13 connected to the base 6, a magnetic disk 12 connected to the spindle motor 13, and a swing-type actuator 30 that swings on a pivot cartridge 41. The actuator 30 has a pivot body 40, an actuator arm 60 extending from the body over the disk 12, an HGA 70 cantilevered from the actuator arm 60, a head 80 connected to the HGA 70 and moveable over the surface 15 of the disk 12, and a read transducer 81. The moveable element governed by the servo control system 100, therefore, may be variably regarded as the entire HSA 20 (see FIG. 1), the actuator 30, the head 80, or the read transducer 81.

The servo controller 110 and the plant 150 form a closed-loop servo feedback control system 100 often called a "servo loop." When the loop is "closed" as in FIG. 2, the servo controller 110 accurately positions the read transducer 81 to a desired position (e.g. track) on the surface 15 of the disk 12 rotating beneath the transducer 81 by reading position information with the transducer 81 to determine and feed back actual position, comparing it with the target position, generating an error signal, and then driving the actuator 30 via the VCM 50/51 in a direction which reduces the error signal. Speaking figuratively, the servo controller 110 strives to keep the error signal at zero such that the transducer 81 is kept at the desired position.

The servo control system 100 must be stable in closed-loop operation. It must, in other words, keep the transducer 81 "on track" even though the plant 150 is flexible and subject to external disturbances from noise, resonance, and shock. The position information, however, is usually derived from "embedded" servo sectors containing servo burst pairs that are radially offset to either side of a data track centerline. That means that the position information is only available on a periodic sampled basis. The servo control system 100 has inherent frequency limitations, therefore, because it must compensate for the constant injection of countervailing perturbations of varying frequency, amplitude and phase using only periodic position information.

Moreover, as shown in FIG. 3, the disk drive 10 generally has several heads e.g. 80-0 to 80-5 and several corresponding disk surfaces 15 that each contain embedded servo data—one head 80 per surface 15. In such a drive, all of the heads 80 are commonly carried by one actuator 30 in a single HSA 20, but only one head 80 is active at a time. The HSA's actuator arms 60 extend above the topmost disk, below the lowermost disk, or between the disks. As a result, the uppermost and lowermost arms only carry one head (80-0 and 80-5), whereas the intermediate arms carry two heads (80-1, 80-2 and 80-3, 80-4). Due to electromagnetic differences between the heads 80, their various possible positions in the HSA 20, and normal deviations related to manufacturing the HSA 20 and then assembling it into the drive 10, the frequency response of the overall servo control system 100 varies not only from drive to drive, but also from transducer to transducer 80-0 to 80-N within any one drive. In essence, each disk drive contains N "transducer loops" 100-0, 100-1, . . . 100-N-1 having a one-to-one correspondence with N heads 80-0, 80-1, . . . 80-N-1. Since each transducer loop 100 shares many common elements, each transducer loop 100-0 to 100-5 can be viewed as containing a different plant 150-0 to 150-5 which has a separate frequency response which may or may not provide the overall loop with sufficient stability when subject to noise, resonance, and shock.

Figure 4:
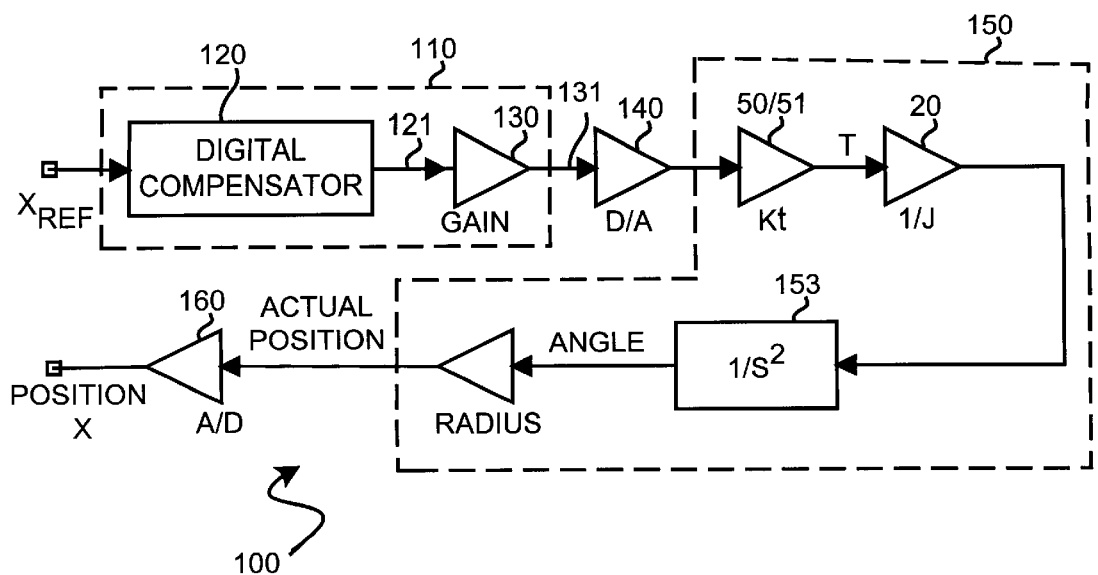
FIG. 4 is a system level diagram of the servo control system 100 in an open-loop state.
Figure 5:
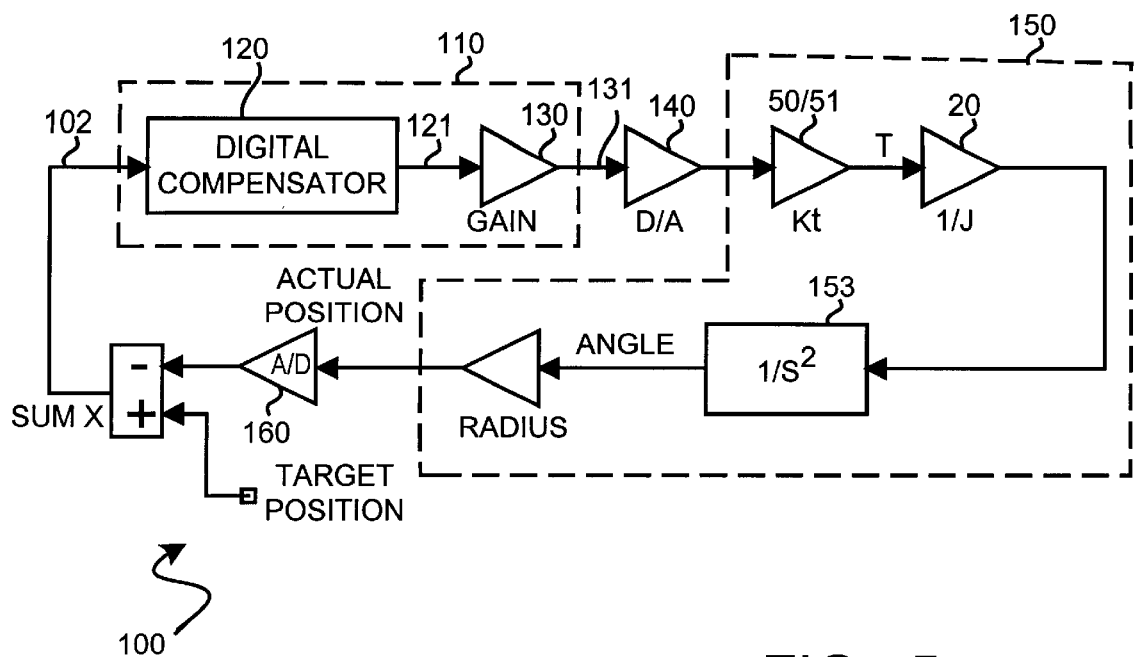
FIG. 5 is a system level diagram of the servo control system 100 in a closed-loop state.

FIGS. 4 and 5, having identical components, are open-loop and closed-loop block diagrams respectively, of any one transducer loop 100 containing a plant 150 that comprises a particular head 80. In the ordinary closed-loop operation of FIG. 5, the servo controller 110 receives a discrete-time error signal 102 (error values or difference values) and then, in accordance with the transfer function or frequency response of its digital compensator 120 and the values of a predetermined number of previous error values, outputs a digital drive value 121 that is scaled by the gain element 130 to produce a digital drive signal 131.

A D/A converter 140 then converts the digital drive signal 131 into an analog drive current "i" to drive the VCM 50/51 formed by FIG. 1's voice coil 50 and permanent magnets 51 and thereby apply a torque T of the required polarity and magnitude to the HSA 20. The ideal VCM 50/51 provides a predetermined torque T in response to a particular current i. The relationship between the torque T and current i is often expressed as a linear VCM torque constant $K_T$ such that $T=K_T*i$.

The torque T from the VCM 50/51 provides the HSA 20 with an angular acceleration $d^2\theta/dt^2$ that is proportional to the HSA's moment of inertia J. Thus, the HSA 20 receives an angular acceleration $d^2\theta/dt^2$ and then, in accordance with the transfer function or frequency response of the plant 150, the zero order hold (ZOH) effect of the D/A converter 140, and several previous acceleration values, as represented by block 153, the HSA 20 is moved to a given angle θ which, when considered with the radius R extending from the pivot body 41 to the transducer 81, produces an actual position. As suggested by the A/D converter 160, the servo control system 100 now uses the transducer 81 to read position information (e.g. servo bursts), processes the burst values to determine the actual position, and outputs a digital value representative of the actual position (e.g. integer track number and fractional track offset).

2. The Open and Closed Loop Frequency Response

By way of background, it is well known that a linear system responds to a sinusoidal input by outputting a sinusoid of the same frequency but having a different magnitude and phase. The system's "frequency response" shows the relationship between the input and output magnitudes and phases which are separately referred to below as the "magnitude response" and the "phase response." A "Bode plot" which comprises adjacent plots of the system's magnitude and phase response to sinusoids of varying frequencies is a common way of illustrating the system's frequency response. The frequency response, moreover, may be considered in an open-loop context (as in FIG. 4) or a closed-loop context (as in FIG. 5). Knowing a system's open-loop frequency response can help identify problems which may arise during closed-loop system operation. The open-loop frequency response, therefore, is routinely considered in order to predict the system's closed-loop behavior.

Figure 6:
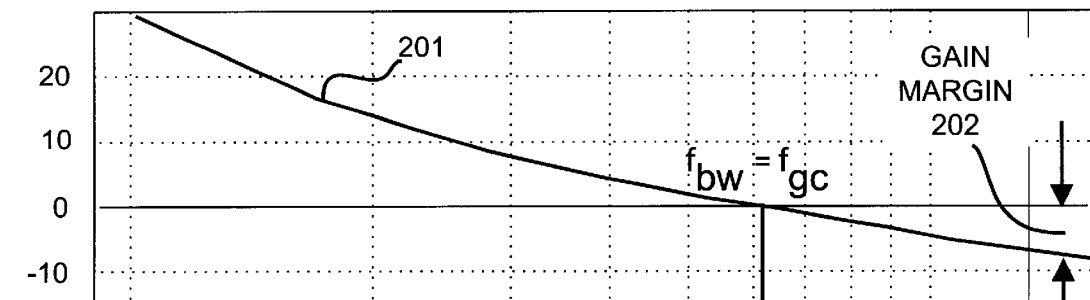
FIG. 6 is a Bode plot showing the open-loop frequency response (magnitude and phase) of the open-loop servo control system 100 of FIG. 4.
Figure 6:
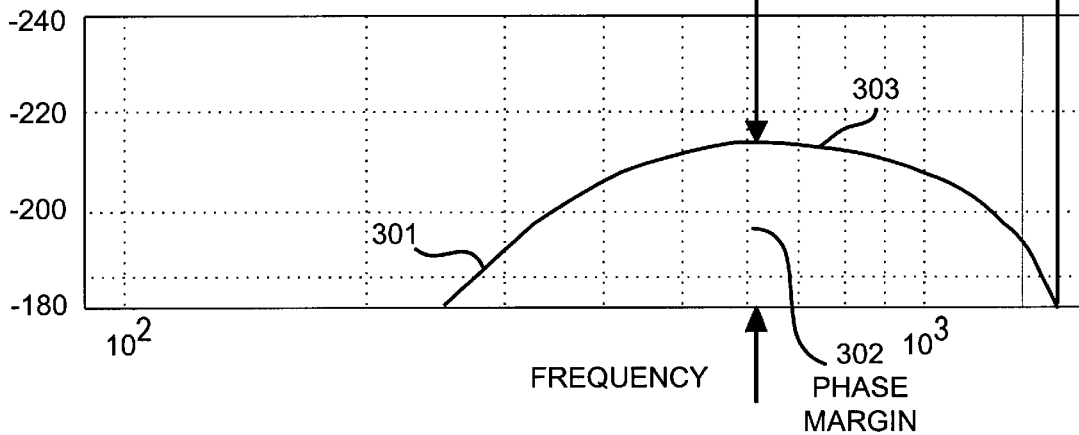

FIG. 6 is a Bode plot showing the open-loop frequency response of the hypothetical, open-loop servo control system 100 of FIG. 4. In particular, FIG. 6 shows the system's magnitude response as a ratio of output to input with a magnitude curve 201 and the system's phase response as a phase delay with a phase curve 301. The Bode plot of FIG. 6 reveals several important frequency response parameters that are considered by designers: an open-loop bandwidth frequency $f_{BW}$, a gain margin 202, and a phase margin 302.

Figure 7:
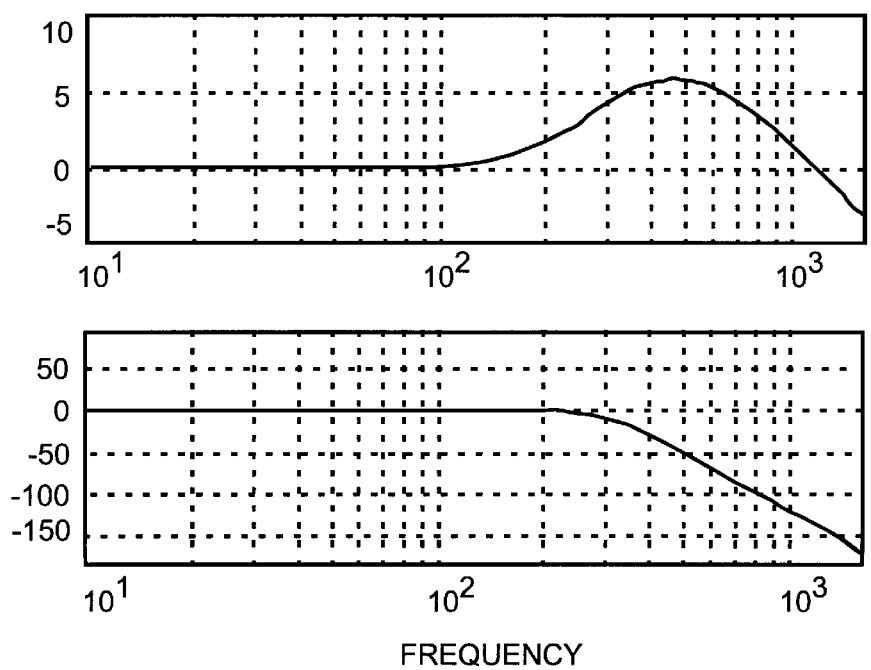
FIG. 7 is a Bode plot showing the closed-loop frequency response (magnitude and phase) of the closed-loop servo control system 100 of FIG. 5.

FIG. 7 is a Bode plot showing the frequency response of the closed-loop system of FIG. 5. Of significance, FIG. 7 shows the system's closed-loop bandwidth frequency $f_{BW-3\ DB}$ where the system's closed-loop magnitude response is equal to −3 dB (i.e. the output magnitude is 0.707 or 70.7% of the input magnitude). The closed-loop bandwidth is an upper frequency boundary on the system's tracking ability. In other words, FIG. 5's closed-loop servo system 100 will not closely follow its target position if subjected to high frequency disturbances that are above the closed-loop bandwidth frequency $f_{BW-3\ DB}$.

The open-loop bandwidth frequency $f_{BW}$ provides a "rule of thumb" value for roughly predicting the system's closed-loop bandwidth frequency $f_{BW-3\ DB}$. The open loop bandwidth frequency $f_{BW}$, however, is not rigidly related to the closed-loop bandwidth frequency $f_{BW-3\ DB}$ and is, therefore, subject to several possible definitions. These inventors define the open-loop bandwidth frequency $f_{BW}$ as equal to the open-loop "gain cross-over frequency" $f_{GC}$ where the output sinusoid equals the input sinusoid in terms of magnitude, i.e. the frequency where the system has a "gain" of 0dB. These inventors have adopted this definition of open-loop bandwidth frequency $f_{BW}$ because it is simple, because it is readily ascertainable, and because the closed-loop bandwidth frequency is normally at least as large. By way of numeric example, the servo controller 110 may be designed such that the servo control system 100 has a nominal gain cross-over frequency $f_{GC}$ and, therefore, an open-loop bandwidth $f_{BW}$ of 650 Hz.

FIG. 6 shows other open-loop parameters which are indicative of the closed-loop system's operating stability—i.e. the gain margin 202 and the phase margin 302. The gain margin 202 and phase margin 302 refer to the maximum change in open loop gain and open-loop phase which can be tolerated, respectively, before the closed-loop system becomes unstable and no longer tracks the target position. The gain margin 202 is defined as the difference between the magnitude curve 201 and 0dB at a "phase cross-over frequency" $f_{PC}$ where the output sinusoid lags the input sinusoid by −180 degrees. The phase margin 302 is defined as the difference between the phase curve 301 and −180 degrees at the gain cross-over frequency $f_{GC}$ (defined above). As numeric examples, the servo controller 110 may be designed such that the overall system 100 has a nominal gain margin 202 of 6 dB and a nominal phase margin 302 of 32 degrees.

Figure 9:
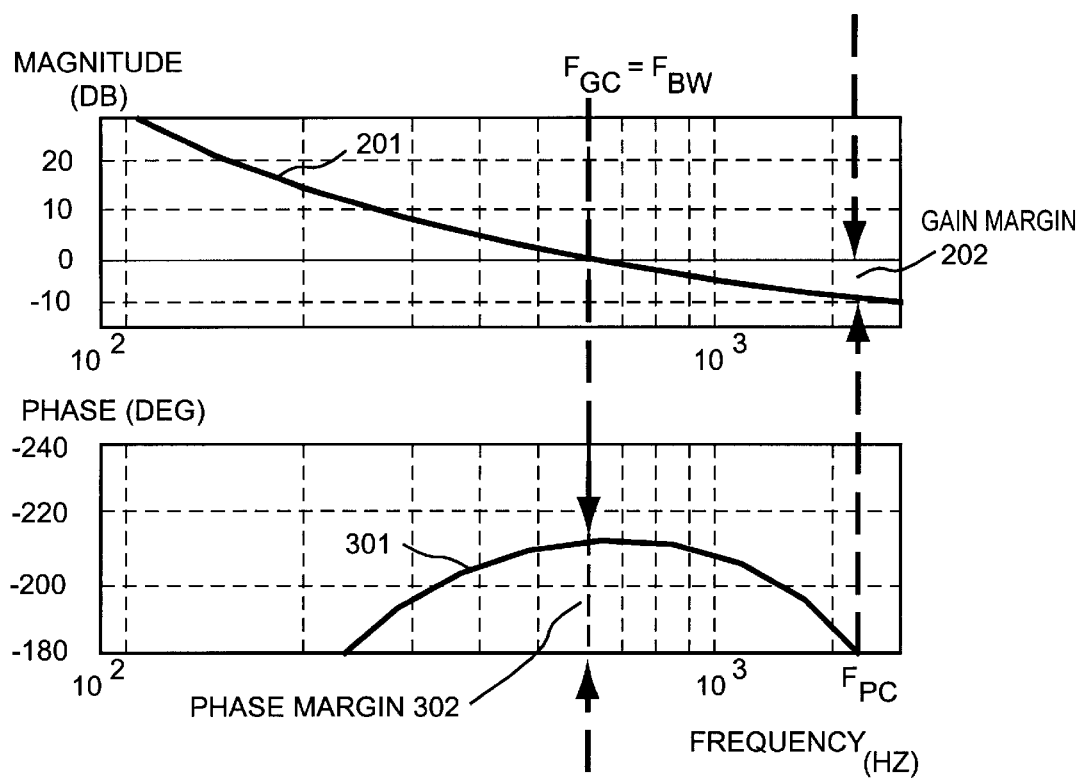
FIG. 9 is a Bode plot showing the open-loop frequency response of a servo control system with a reduced gain margin due to a resonance located at the phase crossover frequency $f_{pc}$.

A disk drive 10 is designed to have an open-loop frequency response that provides for stable closed-loop operation. The designer, in other words, develops a servo controller 110 for the disk drive 10 that provides the control system 100 with a desired open-loop bandwidth $f_{BW}$, a desired gain margin 202, and a desired phase margin 303. The designer can verify the capability of a particular design by using test equipment to measure the actual frequency response of the servo control system in one or more of the drives during development. Ultimately, however, the final design will be implemented in production drives that are produced by the thousands or even by the millions. Each drive is subject to statistical changes in physical parameters. Accordingly, the frequency response of each individual production drive may vary from the nominal frequency response. Statistically speaking, one would expect the gain and phase margins to vary around the design values with an approximately normal distribution. In addition, each drive will have resonant frequencies that vary in location and magnitude due to corresponding variations in physical drive parameters. Within a particular drive, therefore, these variations may conspire to produce a resonant frequency 203 or an alias thereof at the gain cross-over frequency $f_{GC}$, as shown in FIG. 9, such that the drive has reduced gain margin 202.

Disk drives are produced using a self testing methodology known as Intelligent Burn In (IBI). During the IBI process special IBI firmware is executed by the drive's microprocessor to ensure that the drive meets performance and quality specifications. Unfortunately, it was not previously practical to characterize the frequency response of each individual drive when producing massive numbers of drives. The general inability to confirm the frequency response of each individual production drive has resulted in "under-inclusion" i.e. the rejection of drives which did not function well enough to pass during IBI but which might have been salvaged.

The frequency response of a disk drive is conventionally characterized during the design phase by measurement of a representative sample quantity with expensive equipment, as mentioned above. This invention, however, offers an innovative approach whereby each individual production drive can characterize at least some portion of its own frequency response and then fail itself if necessary or, preferably modify itself to improve its frequency response. The invention will be best understood with reference to the following sections regarding characterization and adaptation.

3. Characterizing the Frequency Response

In accordance with a preferred embodiment of this invention, each disk drive 10 measures the frequency response of its own servo control system 100 at a plurality of discrete frequencies over a predetermined frequency range. The frequency range and spacing between discrete frequencies can vary with the intended use for the measurements. For firmware engineering where measurement time is not as important, for example, a frequency range of 20 Hz to 6000 Hz may be used to measure all resources. During the IBI stage of production, however, the frequency range may be reduced to 400 Hz to 2000 Hz, or even less, the goal being to cover a range of frequencies which includes key Bode plot parameters including the gain cross-over frequency $f_{GC}$, the phase cross-over frequency $f_{PC}$, or both, in order to characterize the open-loop bandwidth frequency $f_{BW}$, the gain margin 202, and the phase margin 302 of a drive.

Figure 8A:
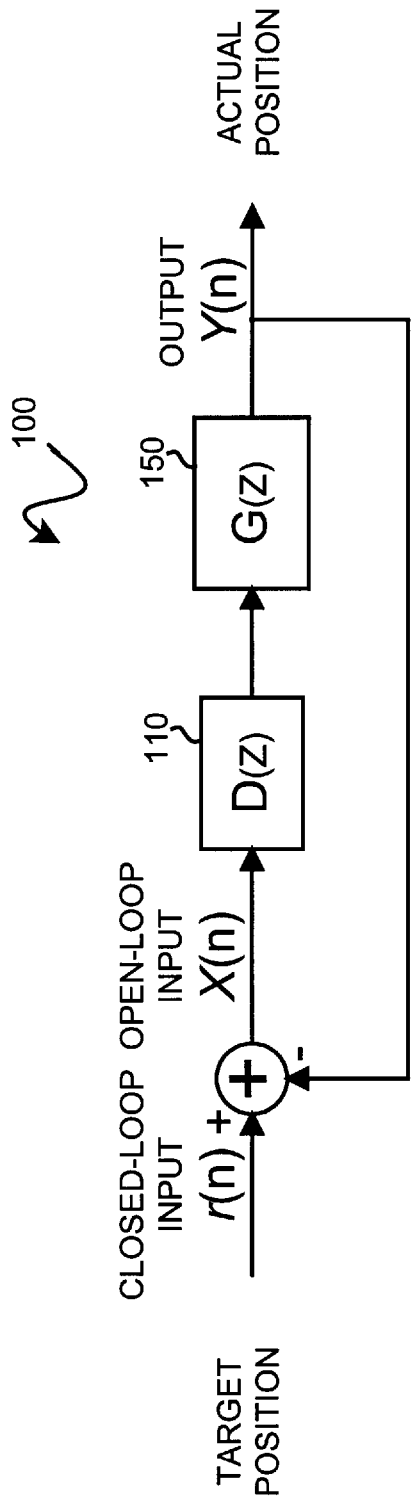
FIG. 8(a) is a simplified block diagram of the servo control system 100.
Figure 8B:
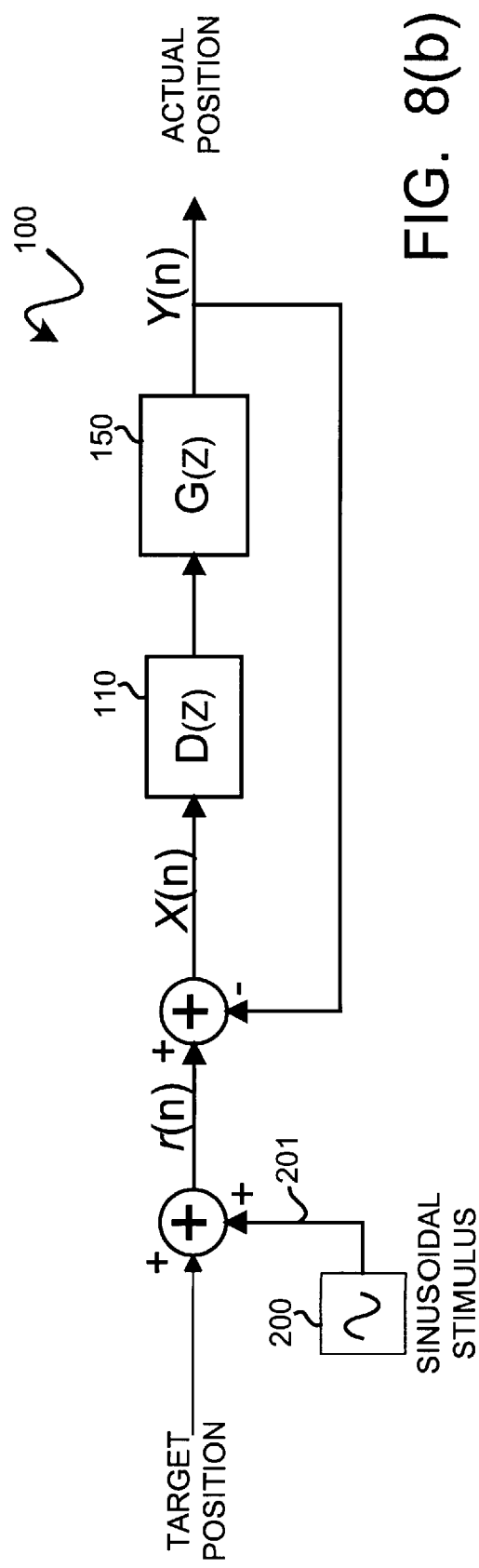
FIG. 8(b) is a simplified block diagram of the servo control system 100 with a sine table 200 injecting the system with a sinusoidal stimulus signal 201.

FIGS. 8(a) and 8(b) are simplified block diagrams of the servo control system 100. FIG. 8(a) shows the system as used in normal operation. FIG. 8(b), by contrast, shows the preferred method of characterization using a sine wave table 200 in order to create and inject a sinusoidal signal 201. The sine wave table 200 may be stored in nonvolatile memory or created on the fly, the approach taken depending on storage and operational constraints. The presently preferred sine wave table 200 has 252 entries, but could have more or less entries depending on the lowest frequency to be measured and the desired frequency resolution. If the disk drive 10 has a spindle rotation frequency of 90 Hz (5400 RPM) and has 78 servo wedges per rotation, for example, it has a sampling frequency of 90 Hz*78, or 7020 Hz. The "fundamental frequency" offered by using each successive entry in the sine table 200 (252 entries in this example) with each successive servo wedge arriving at 7020 Hz in this example is determined as follows:

$$7020\ Hz/252 = 27.8\ Hz \approx 28\ Hz$$

In this particular case, therefore, each successive sine table entry may be used with each successive wedge to inject a minimum frequency equal to the fundamental frequency of 28 Hz. It is also possible to inject the servo loop 100 with integer multiples of the fundamental frequency such as 2*28 Hz=56 Hz, 3*28 Hz=84 Hz, 4*28 Hz=112 Hz, and so on, by using increasingly spaced entries from the sine table 200 to cycle through the sine wave stored in the sine table at a faster rate or frequency. For example, every other sine table entry may be used to inject a frequency of 56 Hz, every third sine table entry may be used to inject a frequency of 84 Hz, and so on.

With respect to each discrete frequency, the system 100 will initially track follow with the loop "closed" and without injecting the stimulation frequency 201 in order to arrive at a steady state position. In an ideal system, we would then "open" the loop, inject a stimulus of known magnitude and phase, and measure the magnitude and phase of the output to derive the open-loop frequency response. It is impractical to operate "open loop," however, due to the imperfect nature of a real disk drive. Accordingly, we preferably derive the open-loop frequency response while operating in a closed-loop context. With the loop still closed, therefore, the read transducer will be "wiggled" while the control system is track following a desired position by injecting the discrete stimulation frequency 201 into the closed loop system. In particular, prior to each consecutive servo sector, the system 100 will inject successive values from the sine table 200 that vary in magnitude in accordance with the discrete frequency currently being derived therefrom. After waiting a short time to allow any transient response to decay, e.g. two revolutions, the system will exhibit a steady state sinusoidal response. The system will then derive and store the read transducer's resulting output values (actual position) for each servo sector in a desired number of revolutions (e.g. three). Next, using the successive inputs and corresponding outputs associated with a particular frequency, the drive performs an FFT analysis to determine the frequency response (magnitude and phase) of its control system with respect to each discrete frequency that is injected into the system.

The system, in other words, performs the foregoing injection and subsequent FFT analysis for each of a plurality of discrete frequencies spaced over a desired frequency range in order to develop values corresponding to an open-loop Bode plot much like that shown in FIGS. 6 and 7. The details of this analysis may be best understood with reference to FIGS. 8(*a*) and 8(*b*) and the following sections.

3a. The System and The Governing Mathematics

FIG. 8(*a*) is a simplified block diagram of the system 100 shown in FIGS. 4 and 5. As shown, the system 100 has an input r(n) (i.e. a target position) which produces an output y(n) (i.e. an actual position). The system 100 as shown is operating in a closed-loop fashion in that its output y(n) is fed back and inversely combined with its input r(n) to produce a difference signal x(n) often called the position error signal (PES). One can regard the input r(n) as a closed-loop input because it is "outside" of the entire loop such that the relationship between the output y(n) and the input r(n) is affected by the loop. Likewise, one can regard the PES x(n) as an open-loop input since it is "inside" the loop. The relationship between the output y(n) and the input x(n) is not affected by the feedback part of the loop. They reside only on the forward part of the loop. They have an open-loop relationship, in other words, even though they are contained in a closed-loop system. Mathematically speaking, the relationship between the PES x(n) and the output y(n) is simply:

$$Y = D(z)^* G(z)^* X$$

and the transfer function is:

$$\frac{Y}{X} = D(z) * G(z)$$

FIG. 8(*b*) is similar to FIG. 8(*a*) except that now a sinusoidal stimulus 201 derived from a sine table 200 is combined with the target position such that the closed-loop input signal r(n) includes an injected sine component of known magnitude and phase. It is this system that we seek to analyze by way of the Discrete Fourier Transform.

The basic equation for a Discrete Fourier Transform of the PES or open-loop input x(n) is:

$$F(k) = \sum_{n=0}^{N-1} \left[ x(n) * \cos\left(\frac{2*\pi*n}{N} *k\right) - i * \sin\left(\frac{2*\pi*n}{N} *k\right) \right]$$

or, if we separate the real and complex components, is:

$$F(k) = \sum_{n=0}^{N-1} \left[ x(n) * \cos\left(\frac{2*\pi*n}{N} *k\right) \right] - i * \sum_{n=0}^{N-1} \left[ x(n) * \sin\left(\frac{2*\pi*n}{N} *k\right) \right]$$

en a particular input frequency "k" and a plurality N of samples, therefore, we can determine the magnitude |X| and the phase $\theta_{in(k)}$ of the open-loop input x(n) as follows:

$$|X(k)| = \sqrt{\left\{\sum_{n=0}^{N-1} \left[x(n)*\cos\left(\frac{2*\pi*n}{N}*k\right)\right]\right\}^2 + \left\{\sum_{n=0}^{N-1} \left[x(n)*\sin\left(\frac{2*\pi*n}{N}*k\right)\right]\right\}^2} \quad (1)$$

$$\theta_{in(k)} = \tan^{-1} \frac{\left\{\sum_{n=0}^{N-1} \left[x(n)*\sin\left(\frac{2*\pi*n}{N}*k\right)\right]\right\}}{\left\{\sum_{n=0}^{N-1} \left[x(n)*\cos\left(\frac{2*\pi*n}{N}*k\right)\right]\right\}} \quad (2)$$

Likewise, we can determine the magnitude |Y| and the phase $\theta_{out(k)}$ of the output y(n) as follows:

$$|Y(k)| = \sqrt{\left\{\sum_{n=0}^{N-1}\left[y(n)*\cos\left(\frac{2*\pi*n}{N}*k\right)\right]\right\}^2 + \left\{\sum_{n=0}^{N-1}\left[y(n)*\sin\left(\frac{2*\pi*n}{N}*k\right)\right]\right\}^2} \quad (3)$$

$$\theta_{out(k)} = \operatorname{Tan}^{-1} \frac{\left\{\sum_{n=0}^{N-1}\left[y(n)*\sin\left(\frac{2*\pi*n}{N}*k\right)\right]\right\}}{\left\{\sum_{n=0}^{N-1}\left[y(n)*\cos\left(\frac{2*\pi*n}{N}*k\right)\right]\right\}} \quad (4)$$

3b. Data Collection and Frequency Response Calculation

In order to measure the FFT's of the input x(n) and the output y(n), we need to inject a sinusoidal component 201 at frequency "k" and gather N samples of data. We start, therefore, by using the sine table 200 to inject a frequency "k" (e.g. 28 Hz) into the system. The input x(n) is the PES and is already available in the system since it is ordinarily used to generate a command signal for correcting position. The closed-loop input r(n) is also available in that it is the sum of the target position (often zero or "ontrack") and the sinusoidal stimulus 201. Thus, while the output y(n) is not directly available, it is easily derived from x(n) (the PES) and r(n) (the stimulus) in that:

$$x(n)=r(n)-y(n)$$

or $$y(n)=r(n)-x(n)$$

In operation, the system 100 will gather data for use in equations (1) to (4) over a desired number N of points. For each point of the input x(n), for example, the measured PES=x(n) is multiplied by a cosine term and a sine term which have values that are dependent on the presently injected frequency "k", i.e.:

for the first point $$CosTermX(k)|_{Point1} = PES(k\,|_{Point1})*\cos\left(\frac{2\pi*1}{N}*k\right)\bigg|_{Point1}$$

$$SinTermX(k)\bigg|_{Point1} = PES(k\,|_{Point1})*\sin\left(\frac{2\pi*1}{N}*k\right)\bigg|_{Point1}$$

for the second point $$CosTermX(k)|_{Point2} = PES(k\,|_{Point2})*\cos\left(\frac{2\pi*1}{N}*k\right)\bigg|_{Point2}$$

$$SinTermX(k)\bigg|_{Point2} = PES(k\,|_{Point2})*\sin\left(\frac{2\pi*1}{N}*k\right)\bigg|_{Point2}$$

and so on until all N points have been injected and the corresponding cosine and sine terms have been gathered. The data gathering algorithm can be easily implemented in firmware by keeping separate registers for accumulating the sine and cosine measurements. The required number N of points is governed by the desired number of revolutions over which data is to be gathered (5–10 revs is typical) and the number of servo wedges in one revolution. 3c. Calculating the Magnitude Response From equations (1) to (3) above, we can easily derive the system's open loop magnitude response in that:

$$|D(z)*G(z)| = \frac{|Y|}{|X|} \quad (5)$$

The magnitudes |X(k)| and |Y(k)| of the input x(n) and output y(n) are easily calculated using the registers which contain the sine and cosine terms. After all of the measurements are processed for a particular frequency k, the sine and cosine registers contain the sum of the sine and cosine terms. The square of each register is taken and the result of these two numbers added together. The square root is then taken to provide the magnitude of the input and output at one particular frequency k as shown above in equations (1) and (3).

The system's magnitude response at this frequency k is then be derived with equation (5). Some of these mathematical steps may, of course, be implemented by way of table lookup.

3d. Calculating the Phase Response

From equations (2) and (4) above, we can also easily derive the system's open loop phase response in that $$\angle[D(z)*G(z)]=\theta_{OUT}-\theta_{IN} \quad (6)$$

The phases $\theta_{IN}$ and $\theta_{OUT}$ corresponding to the input x(n) and output y(n) are also easily calculated using the registers which contain the sine and cosine terms. In this case, the contents of the cosine register is divided by the contents of the sine register and the quotient is subjected to an arctangent analysis as shown in equations (2) and (4) above.

The system's phase response at this frequency k is then derived with equation (6) using, for example, a suitable processor function or an arctangent lookup table.

3e. The Bode Plot Values

The drive's firmware ultimately produces a table of Bode plot values (gain and phase values) after developing the magnitude and phase response for each discrete sinusoidal frequency k. FIG. 12 shows a table, for example, that was derived in an actual drive where the number of entries in the sine table, the drive's rotational frequency, and the sampling frequency established a fundamental frequency step of 28 Hz.

Once a disk drive 10 has successfully characterized its own frequency response in terms of Bode plot values for a plurality of discrete frequencies, as in the table of FIG. 12, those values may be analyzed to derive the open-loop bandwidth $f_{BW}$, the gain margin 202, and the phase margin 302 for each of the drive's transducer loops.

Figure 13:
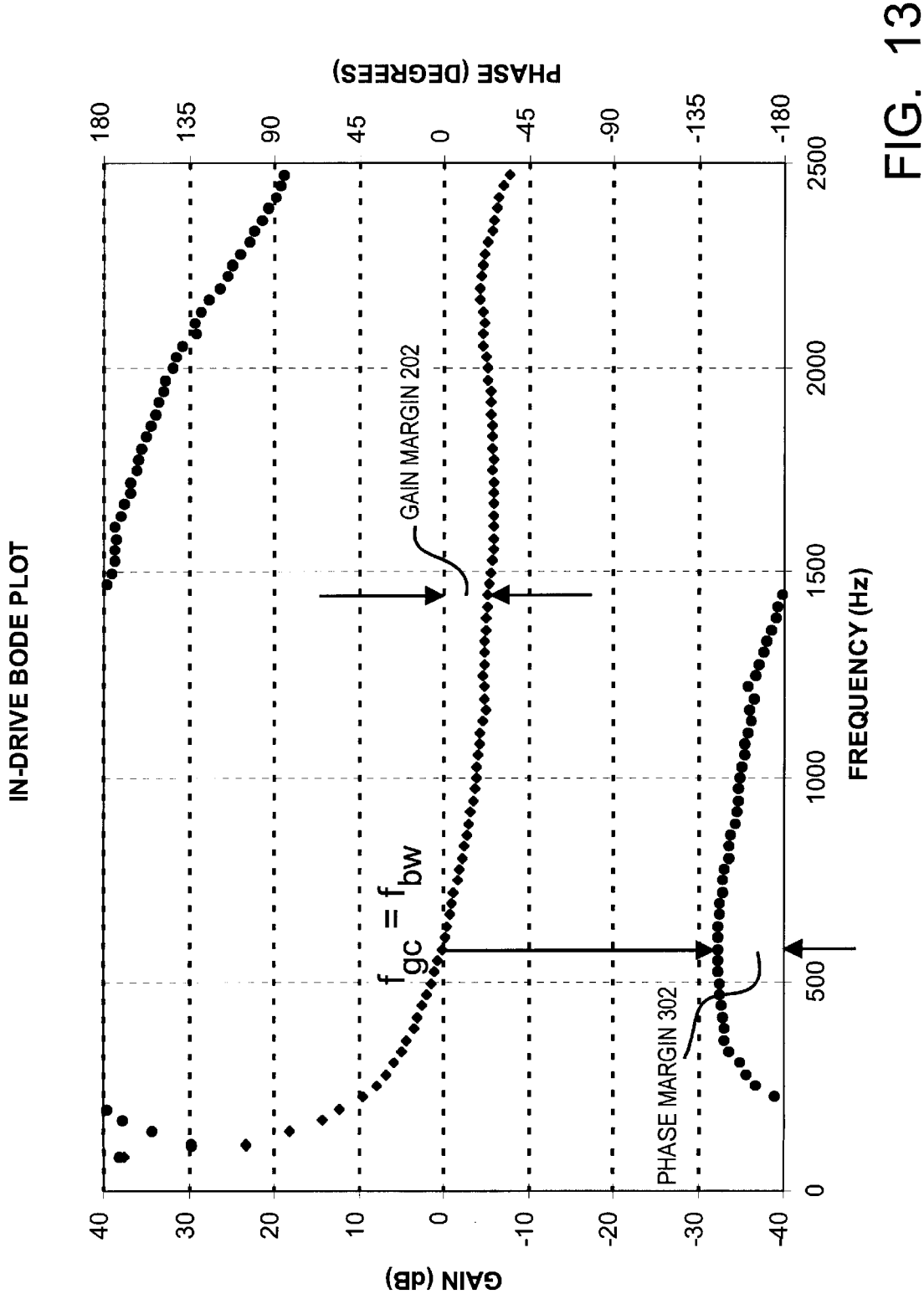
FIG. 13 is a Bode plot of the magnitude and phase values corresponding to the discrete frequencies of FIG. 12.

FIG. 13 is a Bode plot of the magnitude and phase values corresponding to each of the discrete frequencies in the table of FIG. 12. As shown on FIG. 13, one can visually confirm that the open-loop bandwidth $f_{BW}$ is about 610 Hz, the gain margin 202 is about 5.3 dB, and the phase margin 302 is about 35 degrees. The drive's IBI firmware, of course, will determine the location of the gain cross-over frequency $f_{GC}$ through numerical analysis, i.e. by detecting when the gain magnitude transitions from more than one to less than one (e.g. somewhere between 582 Hz and 610 Hz as shown in FIG. 12 by a first set of arrows adjacent to those frequencies). The IBI firmware will similarly determine the location of the phase cross-over frequency $f_{PC}$ by determining when the phase transitions from more than −180 degrees to less than 180 degrees, e.g. somewhere between 1443 Hz and 1470 Hz as shown in FIG. 12 by a second set of arrows adjacent to those frequencies. In either case, the firmware may simply select the closest of the two discrete frequencies, or may interpolate between the two frequency values using standard numerical methods.

Many of the measurements reflected in the above table are not needed to determine the open-loop bandwidth $f_{BW}$, the gain margin 202, and the phase margin 302. It is only necessary, in fact, to measure the magnitude and phase response for frequencies located near the expected or nominal gain cross-over frequency $f_{GC}$ and the expected or nominal cross-over frequency $f_{PC}$, i.e. frequencies near the frequency pairs identified in bold in FIG. 12. It is theoretically possible, therefore, to reduce the number of measurements made.

4. Using the Frequency Response Measurements

The drive 10 develops an open-loop bandwidth $f_{BW}$, a gain margin 202, and a phase margin 302 for each of the drive's transducer loops 100-0 to 100-N-1 as explained above. The drive 10 can then use the frequency response parameters with varying degrees of complexity.

4a. Pass/Fail Analysis

Figure 14:
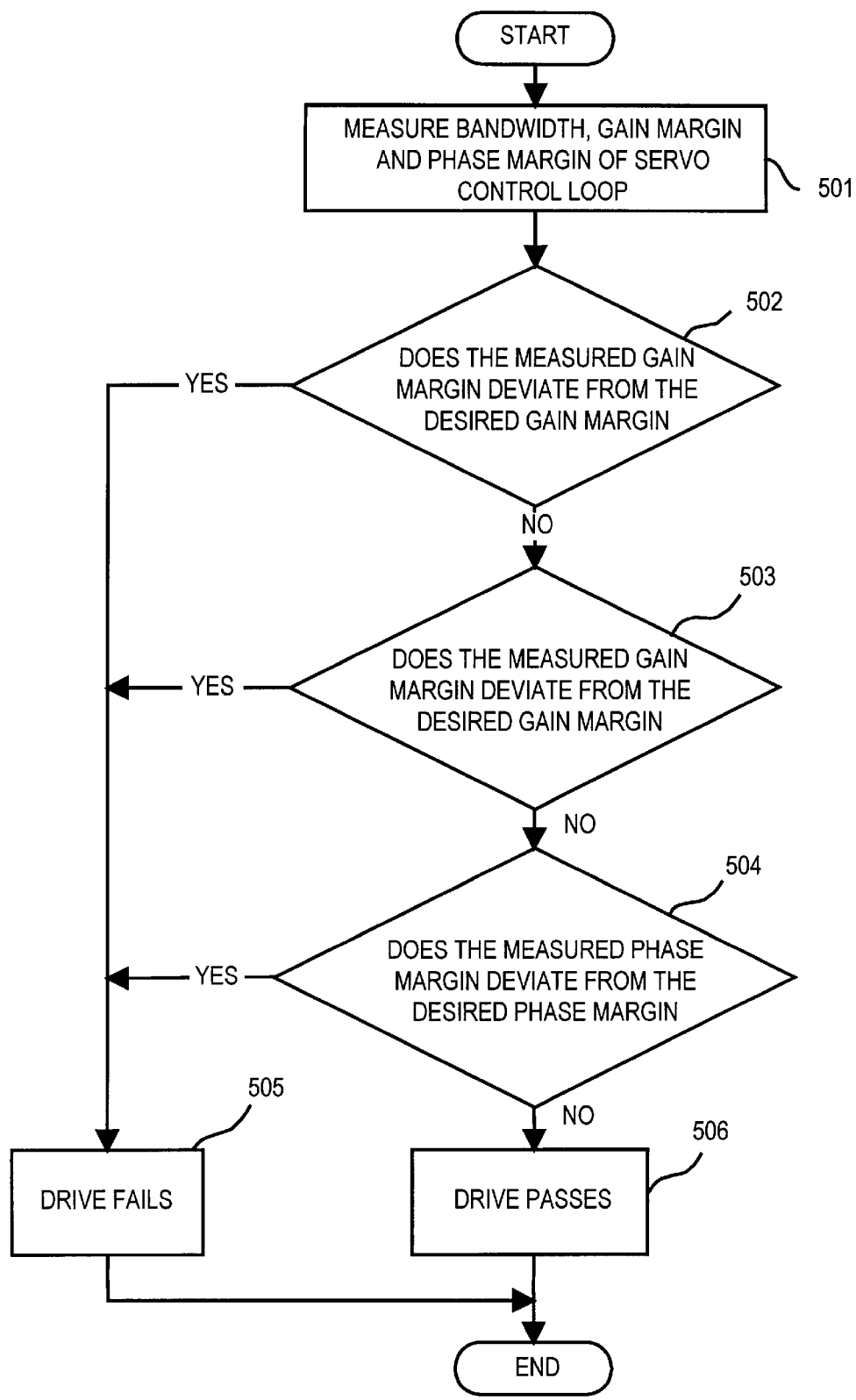
FIG. 14 is a flow chart showing a pass/fail analysis.

At the first level of complexity, the disk drive 10 may simply pass or fail itself on the basis of its autonomously, self-measured frequency response. In one respect, the self-measured frequency response may be analyzed by the disk drive firmware to detect anomalies in the gain curve such as slope changes over a particular frequency band or amplitude peaks which, although not a violation of gain margin requirements, are indicative of individual drive characteristics which forecast failure of the drive to meet performance standards. In another respect FIG. 14 shows, for example, that the drive's IBI firmware may designate a failure if the frequency response shows that the drive's open-loop bandwidth frequency $f_{BW}$, gain margin 202, or phase margin 302 are out of predetermined bounds. At step 501, the drive measures its system's bandwidth $f_{BW}$, gain margin, and phase margin as discussed above under the heading of "characterization." At steps 502, 503, and 502, respectively, the drive compares the measured values with desired values and, if any do not pass, at step 505 the drive "fails" itself and terminates the IBI process so that the drive may be repaired or discarded. At step 506, assuming that the system's bandwidth $f_{BW}$, gain margin, and phase margin are in bounds, the drive "passes" itself and continues the IBI process.

This use of individual, drive-by-drive, frequency response criteria offers significant advantages over the current manufacturing process in that it may properly "fail" marginal drives which may perform well enough to pass IBI but may later fail in use.

4b. Adaptation of the Compensator

At the second and preferred level of complexity, the disk drive 10 adapts itself based on the self-measured frequency response. The disk drive 10 can alter the frequency response of each transducer loop 100 by primarily changing the gain of its servo controller 110, and by secondarily, if at all, changing the poles, the zeroes, or both of its servo controller 110.

The drive preferably starts, referring back to FIGS. 3, 4 and 6, by altering the gain 130 of the servo controller 110-0 to 110-5 associated with each transducer loop 100-0 to 100-5 in order to change the corresponding gain margins 202 and improve the operating stability of each transducer loop, or simply to make the gain margins more consistent from transducer loop to transducer loop. Changing the gain, however, necessarily changes the system's open-loop bandwidth frequency $f_{BW}$ and the system's phase margin 302. In a further embodiment, therefore, if the gain margin change causes a considerable (e.g. >2°) change in phase margin, the drive secondarily alters the poles or zeroes of the compensator 120 in its servo controller 110 in order to recover some or all of the phase margin 302 lost in the initial adjustment.

Figure 10:
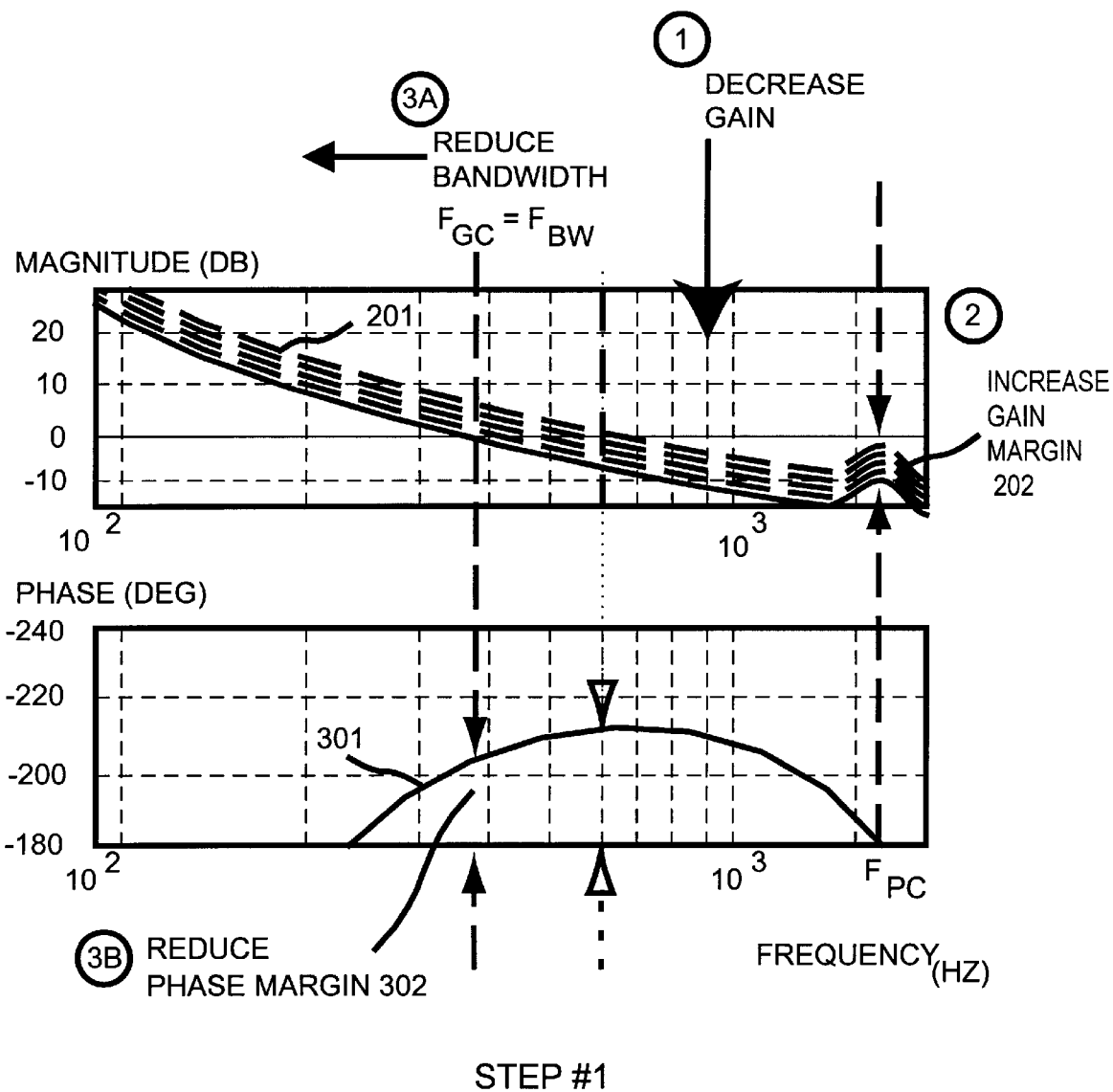
FIG. 10 is a Bode plot drawn relative to FIG. 8 showing how decreasing the gain of the servo controller moves the magnitude curve 201 down and increases the gain margin 202 but reduces the bandwidth $f_{BW}$ and the phase margin 302.
Figure 11:
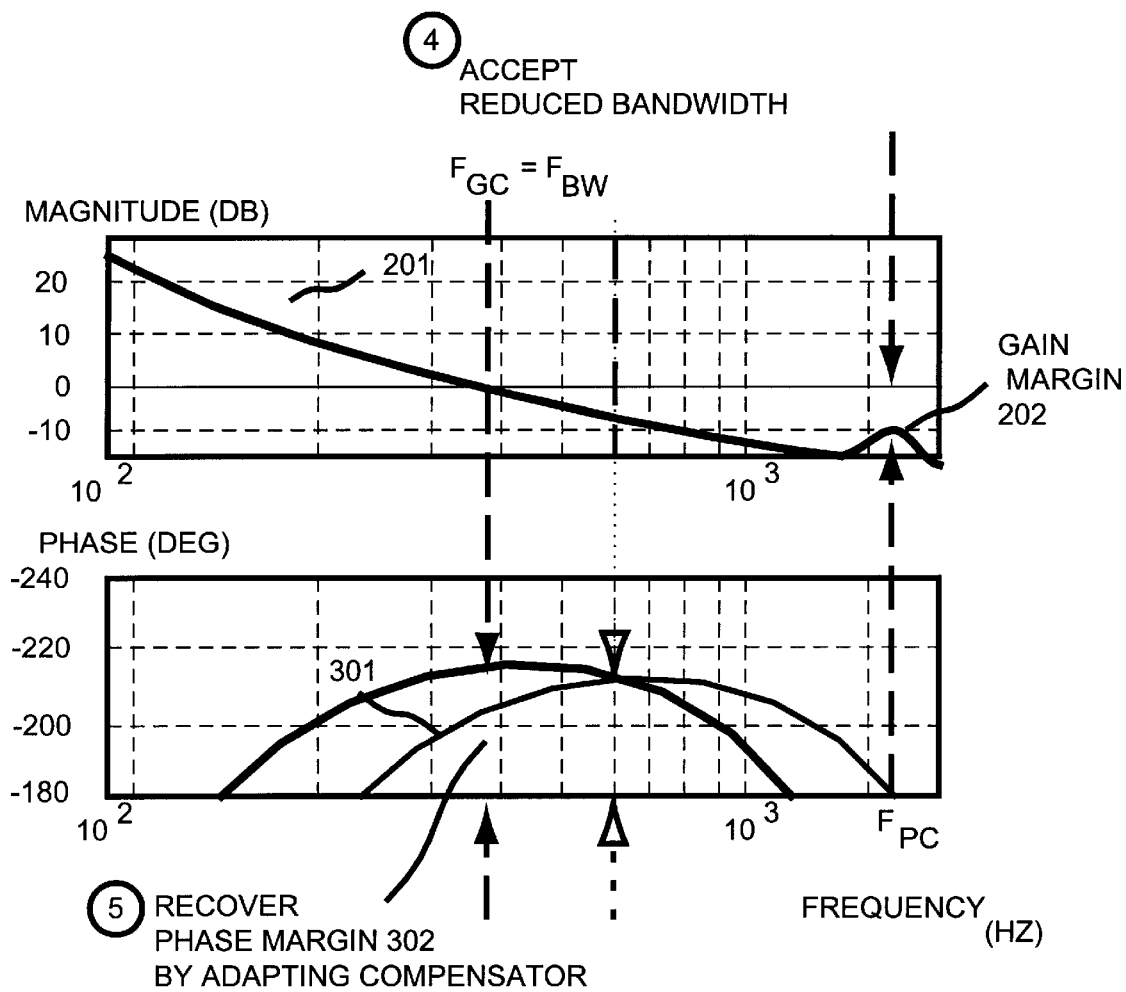
FIG. 11 is a Bode plot relative to FIG. 9 showing how adapting the poles and zeroes of the compensator may recover the phase margin 302.

FIG. 9, 10 and 11 broadly illustrate the operation and effect of the present invention. FIG. 9 shows the frequency response for a particular transducer loop. The response is marginal or sub-optimal because of a resonance 203 that impinges on the loop's gain margin 202. FIG. 10 shows how decreasing the gain increases the gain margin 202. Varying the gain comes at some cost, however, because it also varies the bandwidth and the phase margin 302. In this case, reducing the gain improves the gain margin, but it lowers the bandwidth $f_{BW}$ and it reduces the phase margin 302. Within reasonable limits, however, it may be possible to simply improve the gain margin 202 and absorb the effect of the reduced bandwidth $f_{BW}$ and the reduced phase margin 302.

FIG. 11 shows that it is possible to compensate for some of the detrimental effect of varying the gain. With respect to the phase margin 302 the IBI firmware can vary the poles, the zeroes, or both, in the compensator 120 in order to recover some or all of the phase margin 302. Even so, the reduced bandwidth must be tolerated.

(i) Primary Step Of Adapting The Gain

Figure 15:
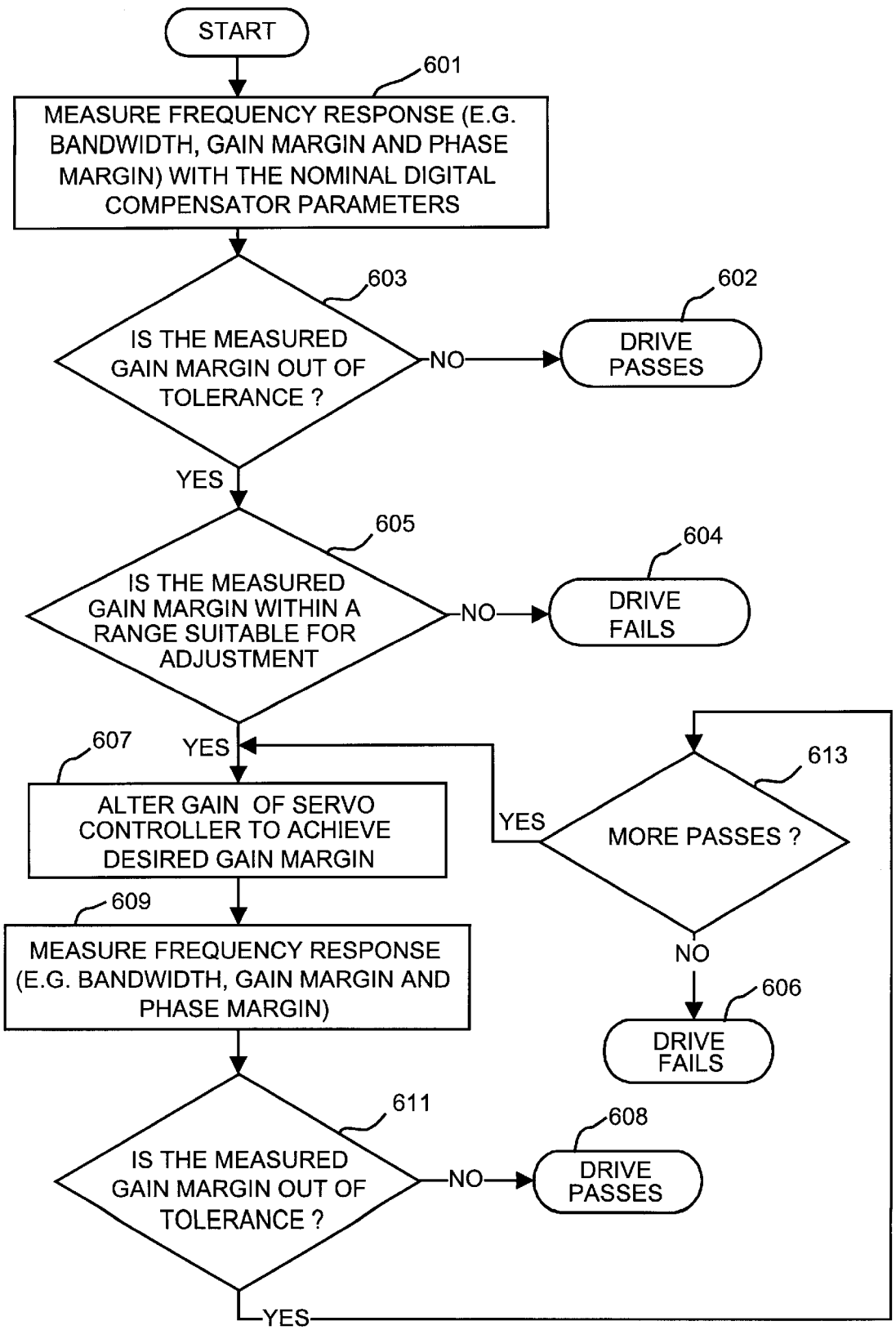
FIG. 15 is a flow chart showing a first adaptation technique that only involves modifying the gain as shown in FIG. 10.

FIG. 15 shows the steps of a first preferred method of adaptation which only involves gain. At this point, the IBI firmware in drive 10 only modifies the servo controller's gain element 130 to correct for any variance between a measured gain margin and the desired gain margin 202.

Changing the system's gain changes the system's frequency response in a fairly intuitive manner. As shown in FIG. 10, for example, reducing the gain "shifts" the magnitude curve 201 downward. Adding gain does just the opposite. Accordingly, if the system needs more gain margin 202 in a particular transducer loop, it lowers the magnitude curve 201 by reducing the gain of the gain element 130 and, if the system needs less gain margin 202, it raises the magnitude curve 202 by increasing the gain of the gain element 130.

At step 601, the IBI firmware in the disk drive characterizes the frequency response of its transducer loops 100-0 to 100-5 (see FIG. 3) as described above. At step 603, the drive determines whether or not the measured gain margin is out of tolerance. If the gain margin 202 is within tolerance limits, the drive passes at 602 and the process is terminated. If the measured gain margin is out of tolerance, at step 605 the measured gain margin is evaluated to determine If it is within a range suitable for adjustment. It has been determined by the inventors that if the gain margin of a drive is too far out of tolerance at this stage, it is not profitable to proceed with adjustment. The range of tolerable deviation from the desired target is determined by drive characterization during the design stage. If the gain margin is too far out of tolerance at step 605, the drive is failed at step 604 and the process terminated. If the gain margin is within a suitable range, at step 607, the gain is altered to achieve the desired gain margin. At step 609 the frequency response is measured again to verify that the change was effective. At step 611, the gain margin is again checked to see if it is within a tolerable range. If it is, the drive is passed at step 608. If not, (YES output of 611) a check to see if more passes are allowed is made at 613. If not the disk drive is failed at 606. If another iteration is permitted, the loop is re-entered at 607. By limiting the number of passes, a reasonable tradeoff can be made between yield, reliability and manufacturing time.

(ii) Optional Secondary Step Of Adapting The Poles & Zeroes

Figure 16:
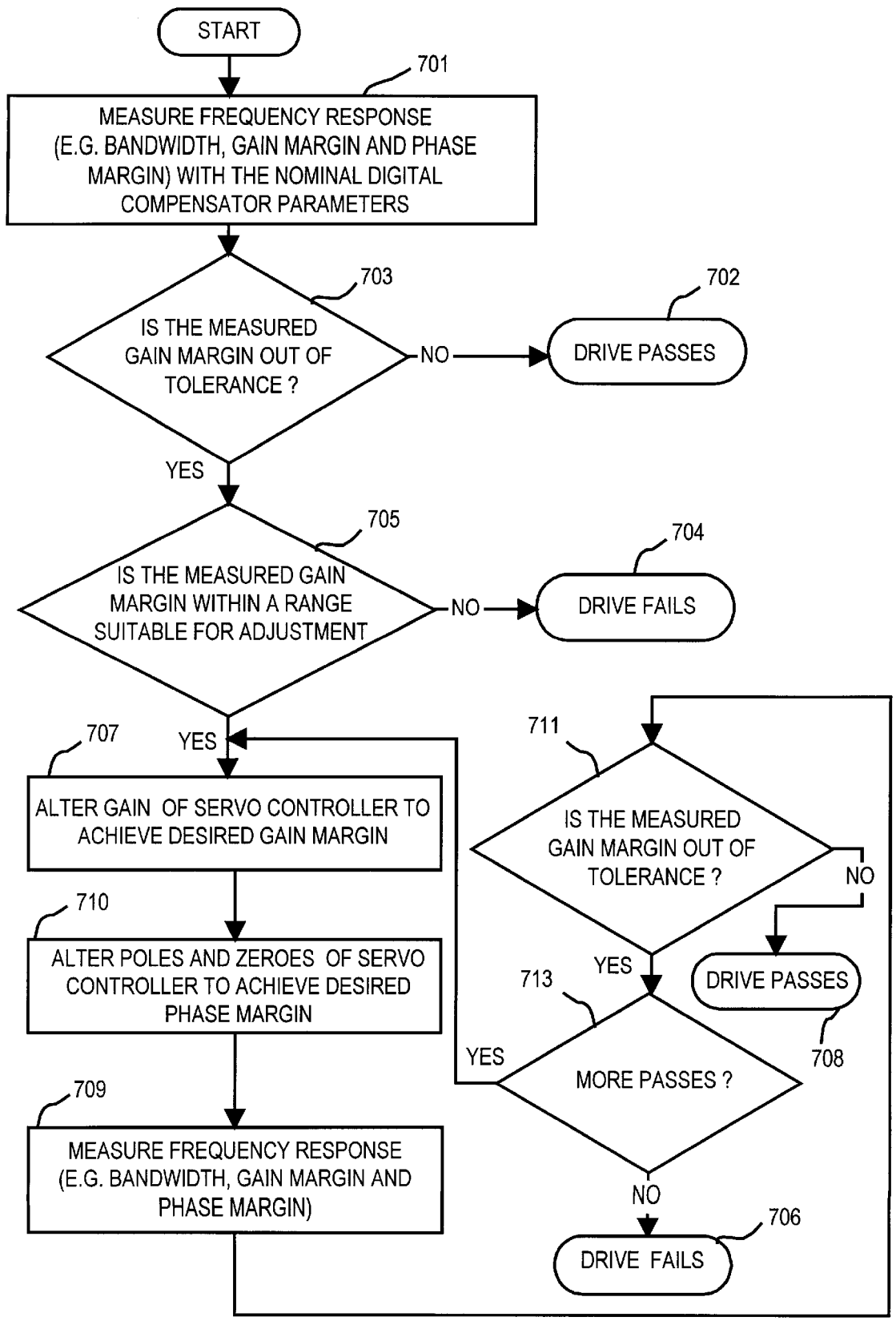
FIG. 16 is a flow chart showing a second extended adaptation technique that involves initially modifying the gain, as in FIG. 15, to increase the gain margin 202 as shown in FIG. 10 and then secondarily modifying the compensator to recover the phase margin 302 as shown in FIG. 11.

FIG. 16 shows an enhanced method which, relative to FIG. 15, includes a step 710 wherein the system alters the poles, the zeroes, or both, in order to recover the phase margin that was reduced by varying the gain in a previous step. The steps in FIG. 16 which are comparable to those in FIG. 15 are similarly numbered such that step 701 corresponds to 601 and so on.

FIGS. 9, 10 and 11 illustrate the benefit of the additional step 710. Recall that FIG. 9 shows a frequency response with too little gain margin and that FIG. 10 shows how (1) decreasing the gain (2) increases the gain margin 202. As also shown in FIG. 10, however, changing the system's gain comes with a penalty because it also (3A) reduces the system's gain cross-over frequency $f_{GC}$ and open-loop bandwidth frequency $f_{BW}$ (which are the same in the preferred embodiment). In particular, reducing the gain value of the gain element 130 to "down shift" the gain curve 201 and gather additional gain margin 202, also "left shifts" or lowers the system's gain cross-over frequency $f_{GC}$ and open-loop bandwidth frequency $f_{BW}$. Conversely, raising the system's gain "right shifts" or increases the system's gain cross-over frequency $f_{GC}$ and open-loop bandwidth frequency $f_{BW}$. It is obviously undesirable to lower the system's open-loop bandwidth frequency $f_{BW}$, but it is possible to tolerate some reduction in bandwidth (at some cost with respect to once-around cancellation and settling) in exchange for increased gain margin.

Moreover, regardless of whether the system gain has increased or decreased, the change moves the gain cross-over frequency $f_{GC}$ away from the peak 303 of the gain curve 301—i.e. away from the position which provides the greatest phase margin 302. Accordingly, if we change the gain element 130 to vary the gain margin 202 considerably, we should preferably change the digital compensator 120 as well in order to move or reshape the phase curve 301 to reposition its peak 303 at or near the new gain cross-over frequency $f_{GC}$ and thereby "recapture" some of the lost phase margin 302.

At step 710, however, we can further change the system's frequency response by changing the poles or zeroes, or both, in the controller's compensator 120. The system 100 can change the compensator 120 by using a lookup table to identify new poles and zeroes based on an appropriate index such as gain margin deficiency, or through a calculation. A lookup table is desirable when the drive has limited processing resources and relatively large memory resources. A calculation is desirable when the drive has relatively high processing ability and limited memory resources. In either case, the presently preferred "index" for selecting the new compensator parameters is the new bandwidth frequency $f_{BW}$ because the system can readily measure the new bandwidth frequency $F_{BW-NEW}$ or, since a tolerable change in gain margin is small due to its concurrent effect on the bandwidth frequency $f_{BW}$, the system can simply estimate the new bandwidth frequency $f_{BW-NEW}$ based on the originally measured $F_{BW-OLD}$ and the change in gain margin. In particular, if the old gain margin is $M_{OLD}$ and the new gain margin is $M_{NEW}=M_{OLD}\pm\Delta$ Gain, then the system can estimate the new bandwidth frequency $f_{BW-NEW}$ as follows:

$$f_{BW-NEW} \approx \frac{10^{0.05\,M_{OLD}}}{10^{0.05\,M_{NEW}}} f_{BW-OLD}$$

The foregoing estimation assumes that we have a gain slope of –20 dB/decade around $f_{BW-OLD}$ and that the change in the gain and, therefore, the change in the gain margin $|M_{new}-M_{OLD}|$ is small (<2 dB). A 1 dB change in the gain margin $|M_{new}-M_{OLD}|$ will cause the new bandwidth frequency $f_{BW-NEW}$ to change about 12.2% relative to the old bandwidth frequency $F_{BW-OLD}$. Given a nominal bandwidth $f_{BW-OLD}$ of 600 Hz, for example, a 1 dB change in the gain margin translates to a 73.2 Hz change in the bandwidth frequency $f_{BW}$.

The following is a exemplary lookup table wherein the new bandwidth $f_{BW-NEW}$ is used to derive a "normalized bandwidth" which is the key for selecting one of several compensator parameters (poles and zeroes). The compensator parameters are presented generally as complex-valued zeroes (e.g. $a_i+jb_i$) and complex-valued poles (e.g. $c_i+jd_i$). it is well known how to establish such values to provide an adequate phase margin 302 (as shown in FIG. 11) and to otherwise optimize performance given a particular drive plant 150 and assuming the system is operating at a particular open-loop bandwidth $f_{BW}$:

| Normalized Bandwidth ($f_{BW-NEW}/Fs$) | Compensator Parameters |
|---|---|
| 0.06 | $z = a_1 + jb_1$ |
|  | $p = c_1 + jd_1$ |
| 0.07 | $z = a_2 + jb_2$ |
|  | $p = c_2 + jd_2$ |
| 0.08 | $z = a_3 + jb_3$ |
|  | $p = c_3 + jd_3$ |
| 0.09 | $z = a_4 + jb_4$ |
|  | $p = c_4 + jd_4$ |
| 0.10 | $z = a_5 + jb_5$ |
|  | $p = c_5 + jd_5$ |

We claim:

1. In a disk drive comprising a sampled servo feedback control system having a sampling frequency and including (1) a plant which has a nominal plant frequency response and (2) a servo controller which comprises (i) a compensator with a nominal compensator frequency response and (ii) a gain element with a nominal open-loop gain, the compensator and gain element being designed to define the overall sampled servo feedback control system with a desired open-loop bandwidth frequency, a desired gain margin, and a desired phase margin which collectively provide for stable closed-loop operation given the nominal plant frequency response, a method of adaptively self-modifying the servo controller to compensate for deviations from the nominal plant frequency response owing to individual plant variations, the method comprising the steps of:

autonomously determining a phase crossover frequency $f_{PC}$ by (1) measuring the sampled servo feedback control system's open-loop phase response to sinusoidal inputs at a plurality of discrete frequencies and (2)

determining which of the plurality of discrete frequencies is associated with an open-loop phase response that is substantially equal to −180 degrees;

autonomously determining a measured gain margin by measuring the sampled servo feedback control system's open-loop magnitude response to a sinusoidal input at the phase cross-over frequency $f_{PC}$; and adjusting the open-loop gain of the servo controller's gain element relative to the nominal open-loop gain if the measured gain margin is different than the desired gain margin to provide an adjusted gain margin that is substantially equal to the desired gain margin.

2. The method of claim 1 wherein:

the plant comprises a base, a disk connected to the base, a swing-type actuator pivotally connected to the base adjacent to the disk, and a read transducer connected to the actuator and moveable over a surface of the disk, and the servo controller drives the actuator in response to an error signal derived from a difference between a desired position and a feedback signal comprising a measured position.

3. The method of claim 1 wherein adjusting the open loop gain sets the phase margin away from the desired phase margin and further comprising the step of:

adjusting the compensator frequency response relative to the nominal compensator frequency response to provide an adjusted phase margin that is substantially equal to the desired phase margin.

4. The method of claim 1 wherein the nominal compensator frequency response is defined by at least one nominal pole and at least one nominal zero.

5. The method of claim 4 wherein the step of modifying the compensator frequency response is accomplished by selecting a new pole, a new zero, or both.

6. The method of claim 5 where the step of modifying the compensator frequency response comprises the steps of:

estimating a change in the open-loop bandwidth frequency due to reducing the open loop gain; and selecting the new pole, the new zero, or both, based on the estimated change in the open-loop bandwidth frequency.

7. The method of claim 6 wherein the step of estimating a change in the bandwidth frequency comprises the steps of:

measuring an initial open-loop bandwidth frequency; and estimating a new open-loop bandwidth frequency based on the measured gain margin and the increased gain margin.

8. The method of claim 6 wherein the step of selecting the new pole, the new zero, or both, based on the estimated change in the open-loop bandwidth frequency comprises the step of looking up values for the new pole, the new zero, or both, in a table of values that is indexed by the open-loop bandwidth frequency.

9. The method of claim 8 wherein the table of values is indexed by the open-loop bandwidth frequency as a ratio of the sampling frequency.

10. The method of claim 6 wherein the step of selecting the new pole, the new zero, or both, based on the estimated change in the open-loop bandwidth frequency comprises the step of calculating the new pole, the new zero, or both, based on a predefined mathematical relationship with the estimated change in the open-loop bandwidth frequency.

11. In a disk drive comprising a sampled servo feedback control system having a sampling frequency and including (1) a plant which has a nominal plant frequency response and (2) a servo controller which comprises (i) a compensator with a nominal compensator frequency response and (ii) a gain element with a nominal open-loop gain, the compensator and gain element being designed to define the overall sampled servo feedback control system with a desired open-loop bandwidth frequency, a desired gain margin, and a desired phase margin which collectively provide for stable closed-loop operation given the nominal plant frequency response, a method of adaptively self-modifying the servo controller to compensate for deviations from the nominal plant frequency response owing to individual plant variations, the method comprising the steps of:

autonomously determining a phase crossover frequency $f_{PC}$ by (1) measuring the sampled servo feedback control system's open-loop phase response to sinusoidal inputs at a plurality of discrete frequencies and (2) determining which of the plurality of discrete frequencies is associated with an open-loop phase response that is substantially equal to −180 degrees;

autonomously determining a measured gain margin by measuring the sampled servo feedback control system's open-loop magnitude response to a sinusoidal input at the phase cross-over frequency $f_{PC}$;

adjusting the open-loop gain of the servo controller's gain element relative to the nominal open-loop gain if the measured gain margin is different than the desired gain margin to provide an adjusted gain margin that is substantially equal to the desired gain margin; and adjusting the compensator frequency response relative to the nominal compensator frequency response to compensate for the phase margin being moved relative to the desired phase margin by the step of adjusting the open loop gain and to provide an adjusted phase margin that is substantially equal to the desired phase margin.

12. The method of claim 11 wherein:

the plant comprises a base, a disk connected to the base, a swing-type actuator pivotally connected to the base adjacent to the disk, and a read transducer connected to the actuator and moveable over a surface of the disk, and the servo controller drives the actuator in response to an error signal derived from a difference between a desired position and a feedback signal comprising a measured position.

13. The method of claim 12 wherein the step of modifying the compensator frequency response is accomplished by selecting a new pole, a new zero, or both.

14. The method of claim 13 where the step of modifying the compensator frequency response comprises the steps of:

estimating a change in the open-loop bandwidth frequency due to reducing the open loop gain; and selecting the new pole, the new zero, or both, based on the estimated change in the open-loop bandwidth frequency.

15. The method of claim 14 wherein the step of estimating a change in the bandwidth frequency comprises the steps of:

measuring an initial open-loop bandwidth frequency; and estimating a new open-loop bandwidth frequency based on the measured gain margin and the increased gain margin.

16. The method of claim 14 wherein the step of selecting the new pole, the new zero, or both, based on the estimated change in the open-loop bandwidth frequency comprises the step of looking up values for the new pole, the new zero, or both, in a table of values that is indexed by the open-loop bandwidth frequency.

17. The method of claim 16 wherein the table of values is indexed by the open-loop bandwidth frequency as a ratio of the sampling frequency.

18. The method of claim 14 wherein the step of selecting the new pole, the new zero, or both, based on the estimated change in the open-loop bandwidth frequency comprises the step of calculating the new pole, the new zero, or both, based on a predefined mathematical relationship with the estimated change in the open-loop bandwidth frequency.

19. In a disk drive having a sampled servo system having a sampling rate and a nominal bandwidth, wherein the sampled servo system comprises a plant and a servo controller that controls the plant using a compensator and a gain element with a nominal open loop gain, a method for adaptively modifying the servo controller to compensate for plant variations which are incompatible with the nominal gain and bandwidth comprising the steps of:

implementing a self-generated bode plot to determine a gain margin and a phase margin, and if the gain margin is not greater than a predetermined minimum:

adjusting the open loop gain of the servo controller to provide a gain margin which is greater than the predetermined minimum at a bandwidth which is different than the nominal bandwidth; and adjusting the compensator to provide a phase margin which is greater than a predetermined minimum.

* * * * *